United States Patent [19]
Mead et al.

[11] Patent Number: 5,608,861
[45] Date of Patent: Mar. 4, 1997

[54] SYSTEMS AND METHODS FOR DYNAMICALLY MODIFYING THE VISUALIZATION OF RECEIVED DATA

[75] Inventors: Charles N. Mead, St. Louis; Dale B. Frye, Florissant, both of Mo.

[73] Assignee: CareCentric Solutions, Inc., Duluth, Ga.

[21] Appl. No.: 195,932

[22] Filed: Feb. 14, 1994

[51] Int. Cl.$^6$ .................................................. G06F 3/14
[52] U.S. Cl. ........................................................ 395/326
[58] Field of Search ................................. 395/161, 2.42; 345/132; 381/44, 45; 128/697

[56] References Cited

U.S. PATENT DOCUMENTS

| | | | |
|---|---|---|---|
| 4,415,767 | 11/1983 | Gill et al. | 381/45 |
| 4,851,825 | 7/1989 | Naiman | 345/132 |
| 4,897,878 | 1/1990 | Boll et al. | 395/2.42 |
| 5,139,028 | 8/1992 | Steinhaus et al. | 128/697 |

OTHER PUBLICATIONS

Cousins, Steve B. and Kahn, Michael G. "Visualizing Operations on Temporal Data," *IEEE*, 1990, pp. 72–76.

Cousins, et al. "The Display and Manipulation of Temporal Information," 1989 SCAMC, Inc., pp. 76–80.

Cousins, Steve B. and Kahn, Michael G. "The Visual Display of Temporal Information," Elsevier Science Publishers B.V., 1991, pp. 341–357.

*Primary Examiner*—Mark R. Powell
*Assistant Examiner*—Ruay Lian Ho
*Attorney, Agent, or Firm*—Winstead Sechrest & Minick P.C.

[57] ABSTRACT

Data visualization systems and methods for dynamically and interactively specifying circumscribed, context-sensitive data subsets of larger received data sets, combined with the ability to control information abstraction over both the larger received data sets and associated subsets through the utilization of one or more information processing filters and abstraction metrics.

63 Claims, 29 Drawing Sheets

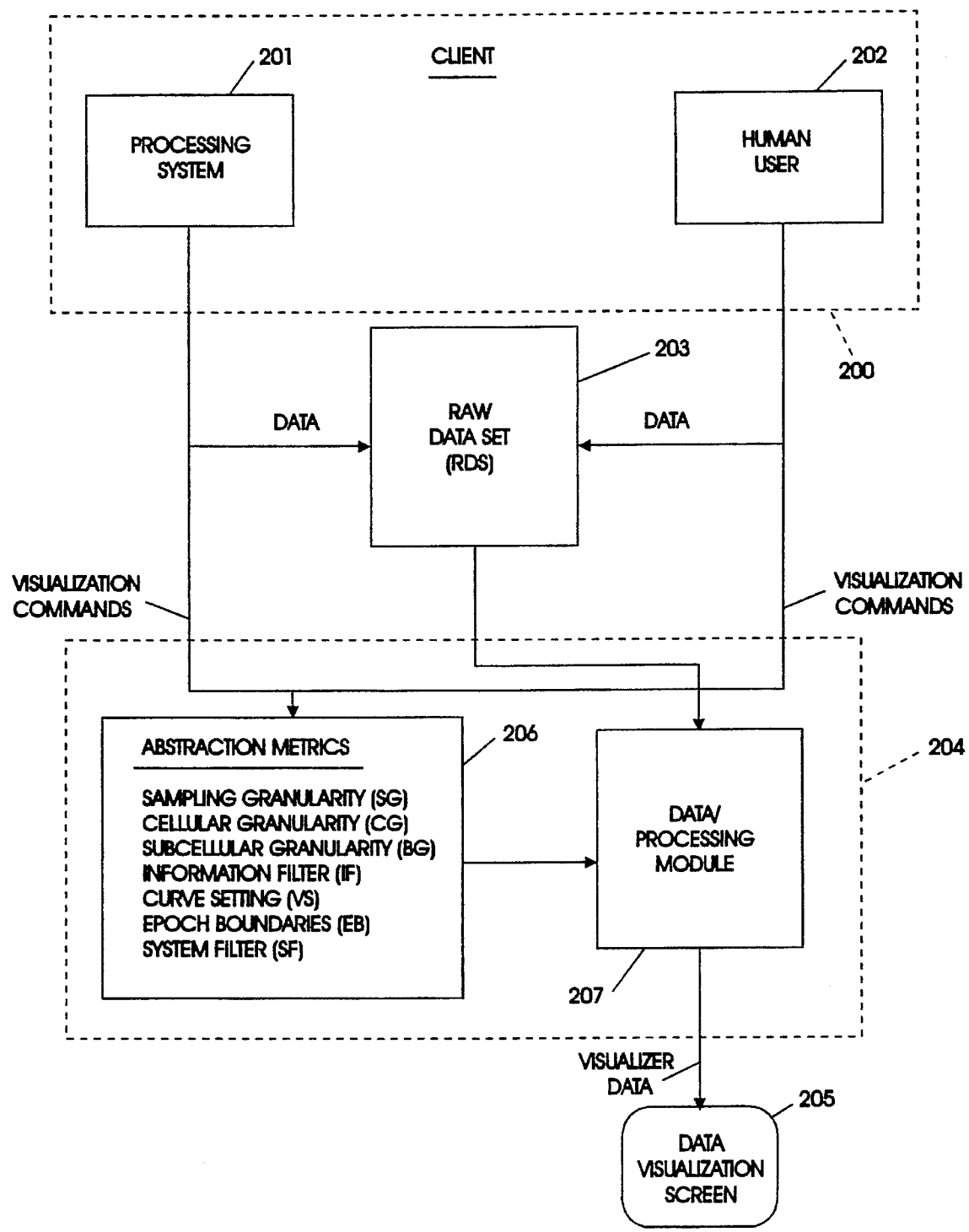

SYSTEMS AND METHODS FOR DYNAMICALLY MODIFYING THE VISUALIZATION OF RECEIVED DATA

TECHNICAL FIELD OF THE INVENTION

The present invention relates in general to computer manipulation of data and the visual presentation thereof, and in particular to systems and methods for dynamically and interactively modifying the visualization of data.

BACKGROUND OF THE INVENTION

Data visualization is best defined as the tangible representation of information. Traditional processing system based data visualization methodologies consist of plotting an underlying raw data set via a prepackaged set of graphical functions. The extent to which a user may interactively examine the data set in more detail within the environment provided by graphical functions is limited to "zooming in" or "zooming out" on the data. In traditional data visualization methodologies, "zooming" consists of data magnification and demagnification. When zooming in, the observer is moved closer to the data, thereby allowing the observation of the data in greater detail. When zooming out the observer is moved farther away from the data with a resultant loss in observable detail.

In contrast, humans scan large amounts of data searching for patterns that suggest that a particular subset of data should be examined in greater detail. The cognitive process of observing more detail within a contextually interesting, localized data subset involves viewing the data less abstractly, i.e., the act of decreasing the abstraction level of the data is equivalent to observing more information. Conversely, when humans are presented with large amounts of data containing excessive or irrelevant detail, they abstract the data to emphasize essential characteristics, i.e., the act of increasing the abstraction level of the data is equivalent to hiding information. This cognitive process of visually sorting and analyzing data is grounded in two human abilities: (1) the ability to dynamically define local subsets of the data which require abstraction, either upward (information hiding) or downward (information displaying); and (2) the ability to "filter" data when the data is to be abstracted upward. In particular, humans decide the specifics of how information is to be hidden. As is evident from the foregoing, there exists a need in the art for a data visualization system which implements a methodology facilitating both interactive data abstraction and context-dependant information filtering.

A first object of the present invention is to provide data visualization systems and methodologies designed to facilitate interactive, context-sensitive, visual abstraction of data.

A second object of the invention is to provide data visualization systems and methodologies which model the human cognitive process for processing data, i.e., the ability to dynamically sort and analyze large data sets, as well as define local subsets of data which require abstraction, either upward or downward.

A third object of the invention is to provide information filters to both large data sets and respective subsets during upward data abstraction, enabling a user of the invention to determine the specifics of how information is hidden.

SUMMARY OF THE INVENTION

A selected embodiment of the invention is a processing system for processing a received input data set comprised of one or more datum in response to a received input command and for generating an output data set for display on a data visualization screen. The processing system includes a processing module which is responsive to the input command and selectably operable to delineate one or more circumscribed, context-sensitive data subsets within the input data set. The processing module is further operable both to enable selected ones of a plurality of abstraction metrics algorithms and filters, and to process each datum of the input data set utilizing the enabled abstraction metrics algorithms and filters thereby generating the output data set.

A selected method of operation of the present invention for generating an output data set for display on a data visualization screen includes the steps of, receiving an input data set which is comprised of one or more datum, interactively receiving at least one input data visualization command from a client which is operable to dynamically control processing of the input data set on a per datum basis, selectively delineating a first data subset within the input data set in response to the interactively received visualization command, selectively enabling at least one of a plurality of selectable information processing parameters for the delineated first data subset also in response to the interactively received visualization command, and processing the input data set by applying the enabled selectable information processing parameters corresponding to each datum including the delineated first data subset thereby generating the output data set. Lastly, the output data set is displayed on the display device.

A first alternate embodiment of the invention is a processing system, including at least one processing unit and at least one memory storage device, for generating an output data set for display on a data visualization screen, the processing system including two input ports and two processing modules. The first input port for receiving an input data set, the input data set comprised of one or more datum, and the second input port for receiving an input command from a client, the input command operable to control the processing of the input data set. The first processing module, selectably responsive to the input command, operable to delineate a circumscribed, context-sensitive data subset within the input data set, and the second processing module, responsive to the input command, operable to enable selected ones of a plurality abstraction metrics algorithms and filters, and to process each datum of the input data set utilizing the enabled abstraction metrics algorithms and filters to generate the output data set.

A second alternate embodiment of the invention is a data visualization system, implemented within a processing system, for processing a received input data set comprised of one or more datum and generating an output data set as a result thereof. The data visualization system comprised of an input port for interactively receiving one or more input commands from a client, the input commands operable to dynamically control processing of the input data set on a per datum basis and a data processor operable to generate the output data set. The data processor comprised of means, selectively responsive to particular ones of the input commands, for delineating circumscribed, context-sensitive data subsets within the input data set, and means, responsive to particular ones of the input commands, for applying selected ones of a plurality of information processing filters and algorithms to each datum including each one of the delineated circumscribed, context-sensitive data subsets.

A first technical advantage of the invention is that a data visualization methodology is taught which enables interactive, context-sensitive, visual abstraction of data.

A second technical advantage of the invention is that a data visualization methodology is taught which models the human cognitive process for processing data. The methodology includes both dynamic sorting and analysis of large data sets, as well as the ability to define local subsets of data which require either upward or downward data abstraction.

A third technical advantage of the invention is that a data visualization methodology is taught which provides information filters, applicable to both large data sets and respective subsets, during upward data abstraction, enabling a user of the invention, whether a human or another processing system, to specifically determine how information is hidden.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a block diagram of the architectural overview of the preferred embodiment of the invention;

DETAILED DESCRIPTION OF THE INVENTION

Figure 1A:
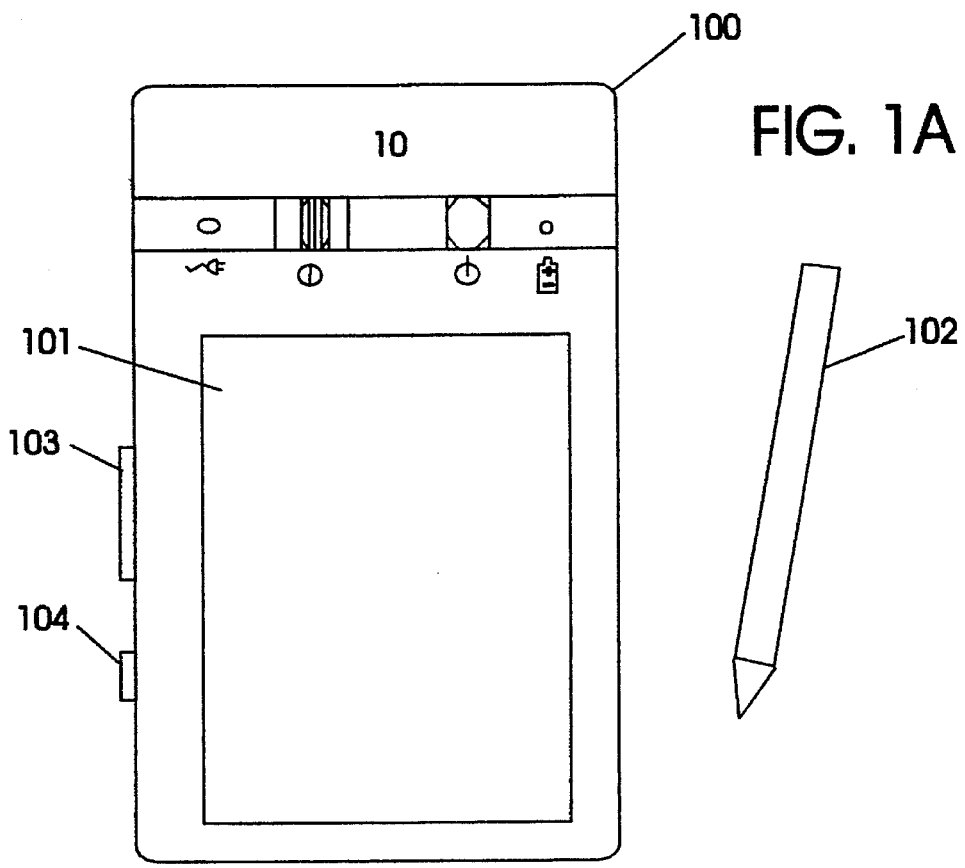
FIG. 1A illustrates an isometric view of a hand held computer in accordance with a preferred embodiment of the present invention.

Referring now to FIG. 1A illustrated is an isometric view of a hand held computer 10, which in the preferred embodiment is an IBM ThinkPad 710T manufactured by International Business Machines, Inc. of Armonk, N.Y. Hand held computer 10 is comprised of a hardware casing 100, a display screen 101, a stylus 102, a disk drive 103 and an input port 104. Implemented within hardware casing 100 is a processing system for processing data in response to one or more instructions. The processing system includes at least one memory storage device (not shown) and at least one processing unit (not shown). The memory storage device is operable to store one or more instructions which the processing unit is operable to interpret and execute. The data is received by the processing system in any of a number of ways, including an external storage disk, such as a floppy disk or a compact disc, via disk drive 103, or as a received data stream, which may be dynamically received, via input port 104, such as a serial or parallel port. An important aspect of the invention therefore is that data collection and visualization need not occur coincidentally. The processing system is also operable to receive, interpret and respond to external stimuli, which may be interactively and dynamically received, from an external input device, such as stylus 102, or via a light pen, a mouse or a keyboard to identify other examples.

In the preferred embodiment the processing unit is an Intel 486 CPU, and the memory storage devices include both random access memory (hereinafter "RAM") and read only memory. Although hand held computer 10 has been utilized for illustrating one implementation of the invention, the invention may alternately be implemented within any processing system, including, for example, those processing systems found in sophisticated calculators and personal, mini, main frame and super computers, not to mention combinations of the foregoing as well.

Figure 1B:
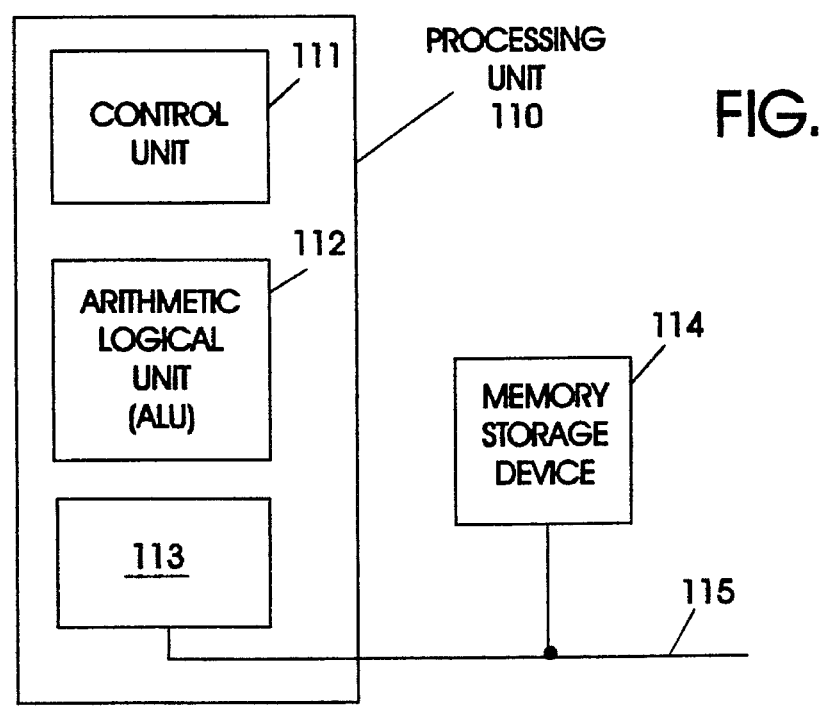
FIG. 1B illustrates a block diagram of a processing system.

FIG. 1B illustrates a conceptual block diagram of one of any number of processing system which may be utilized in conjunction with FIG. 1A. This processing system includes a single processing unit 110 coupled with a single memory storage device 114 via data bus 115. Processing unit 110 includes a control unit 111, an arithmetic logic unit ("ALU") 112, and a local memory storage device 113, such as, for example, stackable cache or a plurality of registers. Control unit 111 is operable to fetch instructions from memory storage device 114. ALU 112 is operable to perform a plurality of operations, including addition and Boolean AND needed to carry out instructions. Local memory storage device 113 is operable to provide high-speed storage used for storing temporary results and control information.

FIG. 2 illustrates a block diagram of the architectural overview of the preferred embodiment of the invention, which includes a Client 200, a Raw Data Set (hereinafter "RDS") 203 (a stream of unprocessed data), an Interactive Context-Sensitive Visual Abstraction System (hereinafter "ICSVA") 204 and a Data Visualization Screen 205. Client 200, which is either another processing system 201, a human user 202, or a combination of both, provides both RDS 203 and visualization commands to ICSVA 204 as first and second inputs, respectively. The visualization commands, in the illustrated embodiment, are dynamically and interactively defined by Client 200 which, if Client 200 is human, would necessitate the utilization of an input device such as stylus 102 of FIG. 1A. RDS 203 is input from either disk drive 103 or input port 104 of FIG. 1A. ICSVA 204, operable to process RDS 203, outputs the resultant visualized data to Data Visualization Screen 205, such as display screen 101 of FIG. 1A.

ICSVA 204 includes an Abstraction Metrics block (hereinafter "AM") 206 and a Data Processing Module 207. In the illustrated embodiment, ICSVA is software coded in ANSII standard "C", a high level programming language, for the PenPoint operating system owned by EO, Inc. It is important to note that although ICSVA 204 in the illustrated embodiment is implemented in software, the invention may easily be implemented in hardware, as special purpose circuitry, or in firmware as a chip set, without departing from the spirit and scope of the invention.

AM 206, responsive to the received visualization commands from Client 200, enables selected ones of a set of dynamically configurable information processing filters and algorithms resident to Data Processing Module 207. Data Processing Module 207 segments RDS 203 and processes each datum utilizing the enabled information processing filters and algorithms. Thus, as each datum of RDS 203 passes through ICSVA 204, it is processed by a configured set of information processing filters, the specifics of which are dynamically and interactively selected by AM 206 through visualization commands received from Client 200, thereby facilitating Client 200's control over upward and downward abstraction.

Client 200 control of hiding and showing of information is developed around the notion of data granularity, i.e., the density of information. The granularity of RDS 203 is referred to the data set's sampling granularity, while the data density of a visualized data set or subset is referred to as the visualization's information granularity. The difference between the sampling granularity of RDS 203 and the information granularity of the visualization is a measure of the Abstraction Level of the visualization. Client 200, as has been introduced, is capable of interactively partitioning data from RDS 203 into contextually-relevant subsets called epochs. The abstraction level of the visualized data for a given epoch is controlled by Client 200 specified values of AM 206. Each local epoch, or data subset, has its own set of abstraction metrics which for any given epoch may be changed without affecting the values of other epochs. Epoch-specific abstraction metrics are stored in an epoch database which is dynamically updated to reflect Client 200 interaction with the visualization. As datum are passed from RDS 203 to the screen for rendering, each data point is linked to its appropriate epoch. This will be discussed in greater detail below. Thus, each datum is processed based on the abstraction metrics currently in effect for that epoch. In the event that no local epochs have been defined, RDS 203 is defined to lie within a single default epoch. In this case, changes made to the default epoch's abstraction metrics affect the visualization of the entire data set. In summary therefore, the abstraction level of a given visualization reflects the degree to which the underlying data from the RDS has been hidden, or abstracted. As more information is hidden, the abstraction level increases (abstraction level values are presented to the user as ratios, e.g., "1:1"—indicating no abstraction; and "10:1"—indicating the hiding of 90% of the information).

Information processing filters included in the illustrated embodiment are First Point (Decimation), Last Point, Mid-Point, Minimum, Maximum, Average and Weighted-Average, all of which are individually well known in the art. It should be noted that alternate embodiments may include any information processing filter, and/or may further include a "tool kit", enabling Client 200 to design and implement custom information processing filters. As is evident from the foregoing, the information processing specifics at any point in time are dependent on the values of AM 206. A complete list of AM 206 is illustrated in the following table:

| Abstraction Metrics | | | | |
| --- | --- | --- | --- | --- |
|  | Global Scope | Local Scope | n-dim | Indiv Param |
| Sampling Granularity | n/a | n/a | n/a | n/a |
| Cellular Granularity | y | y | y | y |
| Subcellular Granularity | y | y | y | y |
| Filter Setting | y | y | y | y |
| Epoch Boundaries | y | y | y | n |
| Curve Setting | y | y | y | y |
| System Filter | y | y | y | y |

Sampling Granularity is fixed at the time of data collection, it is therefore not formally considered an abstraction metrics, however, as is clear from the foregoing, certain aspects of any data visualization are inherently dependent upon Sampling Granularity, as will become evident shortly. Note, a further aspect of the illustrated embodiment enables each one of abstraction metrics, excluding Sampling Granularity, to be scoped either globally or locally and applied on a per-dimension basis (column "n-dim"). Global scoping of a particular abstraction metrics causes it to be applied across each datum of RDS 203. By contrast, local scoping of a particular abstraction metrics results in it being applied to that subset of the RDS contained within a specified epoch. An epoch is defined, for the purposes of this document, as an event, or an instant of time marked by an event, which deliniates a new period of time. In addition, if a multi-parameter data set is being visualized, a further aspect of the illustrated embodiment enables AM 206, with the exception of Sampling Granularity and Epoch Boundaries, to be further partitioned for application to a specific parameter of the data stream. In particular, in the illustrated embodiment, if a multi-parameter data stream is being visualized, the reference Sampling Granularity value for the multi-stream visualization will default to the coarsest (most abstract) value of all the parameter streams being visualized.

Turning to the each of the abstraction metrics individually, Cellular Granularity is a measure of the visualized data density per grid cell. A grid cell is defined, for the purposes of the illustrated embodiment, as an optical display space including "n" ("n" corresponding to dimensional display space) groups of parallel lines, perpendicular to each other, utilized to measure and specify character images. Note however, that alternate embodiments of the invention may support any graphical visualization format without departing from the spirit and scope of the invention. Cellular Granularity is a multiple (generally an integer) of Sampling Granularity and, is commonly termed the "coarseness" or "quantization" of the data magnitude values.

Subcellular Granularity is a measure of the visualized data density in points-per-grid cell. On an infinite resolution screen, Subcellular Granularity could assume any value from one (points only visualized on cell boundaries) to "n" for arbitrarily large values of "n". However, since visualization of data must occur on finite resolution screens, each processing system platform contains a maximum finite density of picture elements (hereinafter "pixels") per grid cell. If it is assumed that maximum visualized data density occurs when one data point is plotted for each physical pixel on the screen, visualization may occur without intervention from the underlying platform-specific graphics hardware and/or graphics software. However, once Client 200 requests a Subcellular Granularity value which exceeds the number of physical pixels available within a physical grid cell, system filtering may occur depending upon the value of abstraction metric System Filter which will be further discussed momentarily.

Information Filters enable Client 200 to control data abstraction based on locally-specified, dynamically assignable information filters, previously identified as First Point, Minimum, Maximum, MidPoint, Average and Weighted Average. Specifically, Information Filters are applied on an epoch-specific basis to collections of raw data points, or datum, called "filter segments." In the illustrated embodiment, output of a specific filter consists of a single point which represents the abstraction on the data in the filter segment by one or more filters. In addition to allowing Client 200 to specify specific Information Filters, an additional level of information processing is provided via the Curve Setting parameter.

System Filter is a boolean metric. If it is set to "OFF", no filtering of data can occur other than that specified by Client 200 via Information Filters and Curve Setting metrics. An System Filter value of "OFF" results in Subcellular Granularity being capped at a value equal to the physical pixel density per grid cell of the processing system platform on which invention is operating. If System Filter is set to "ON", then the underlying graphics hardware and software are utilized to filter data in a manner not controllable by Client 200.

Figure 3:
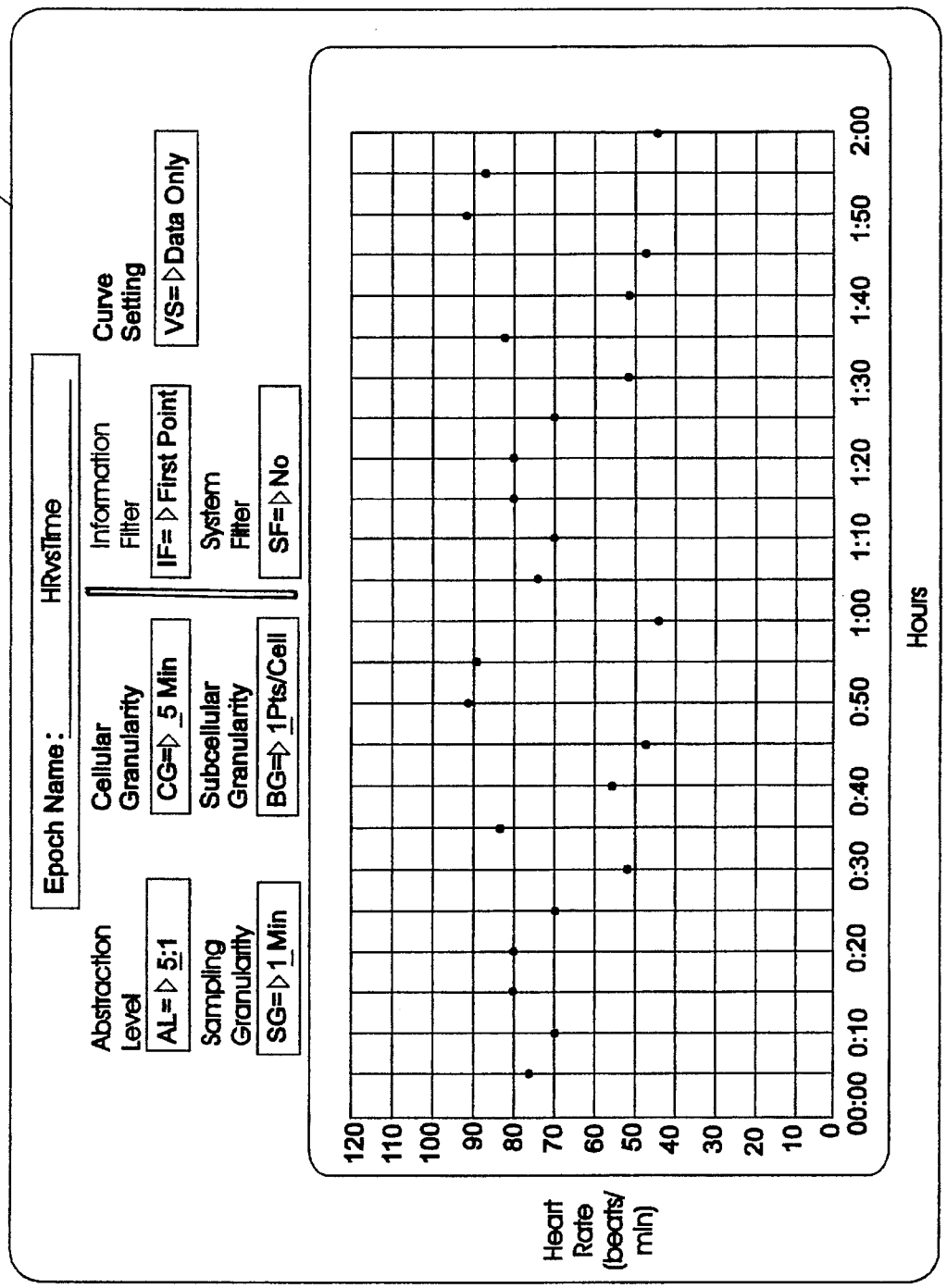
FIG. 3 illustrates a data visualization technique of the illustrated embodiment in which medical data is plotted on a display screen utilizing the "Data Only" curve setting.
Figure 4:
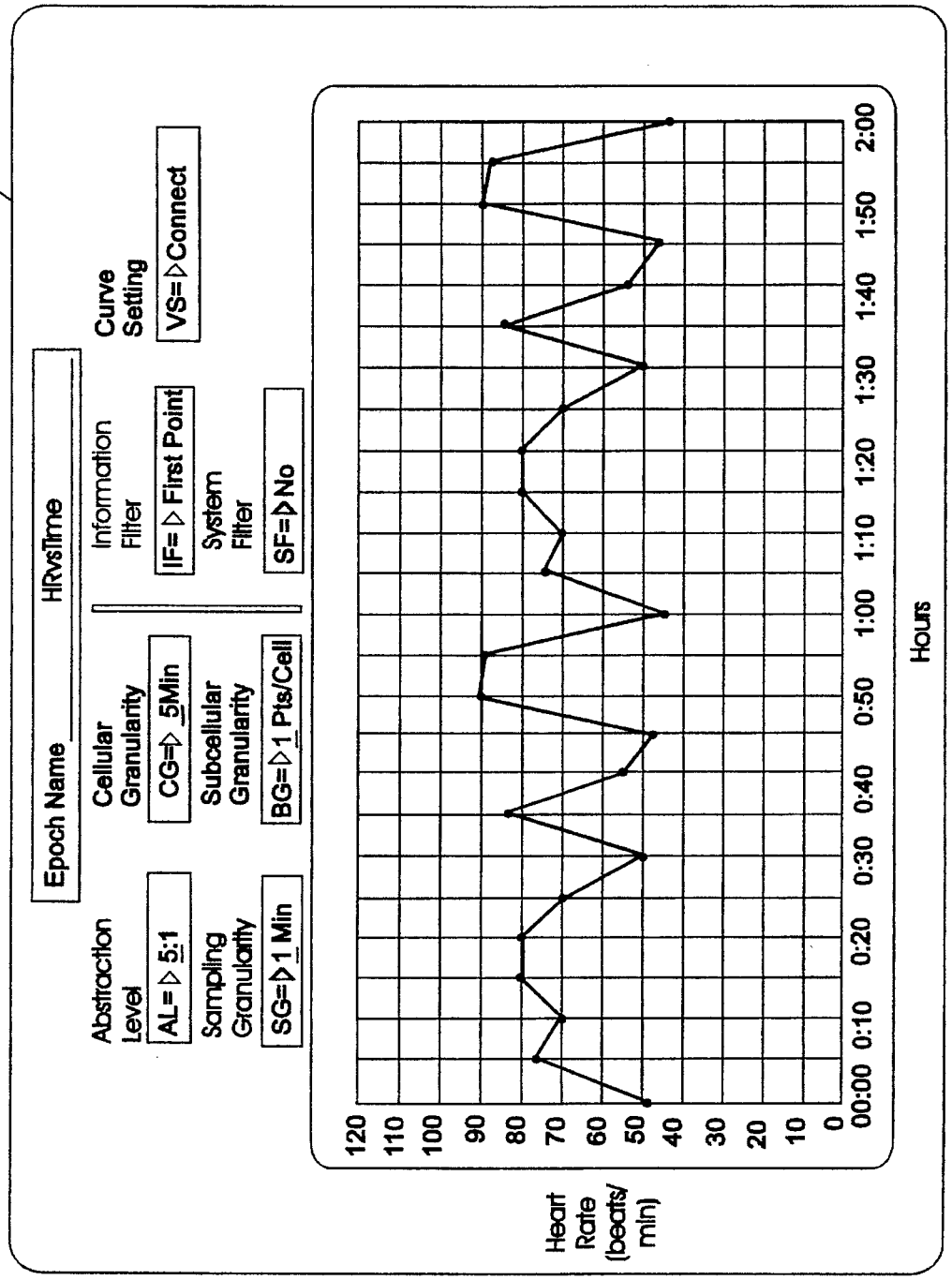
FIG. 4 illustrates a data visualization technique of the illustrated embodiment in which medical data is plotted on a display screen utilizing the "Connect" curve setting.
Figure 5:
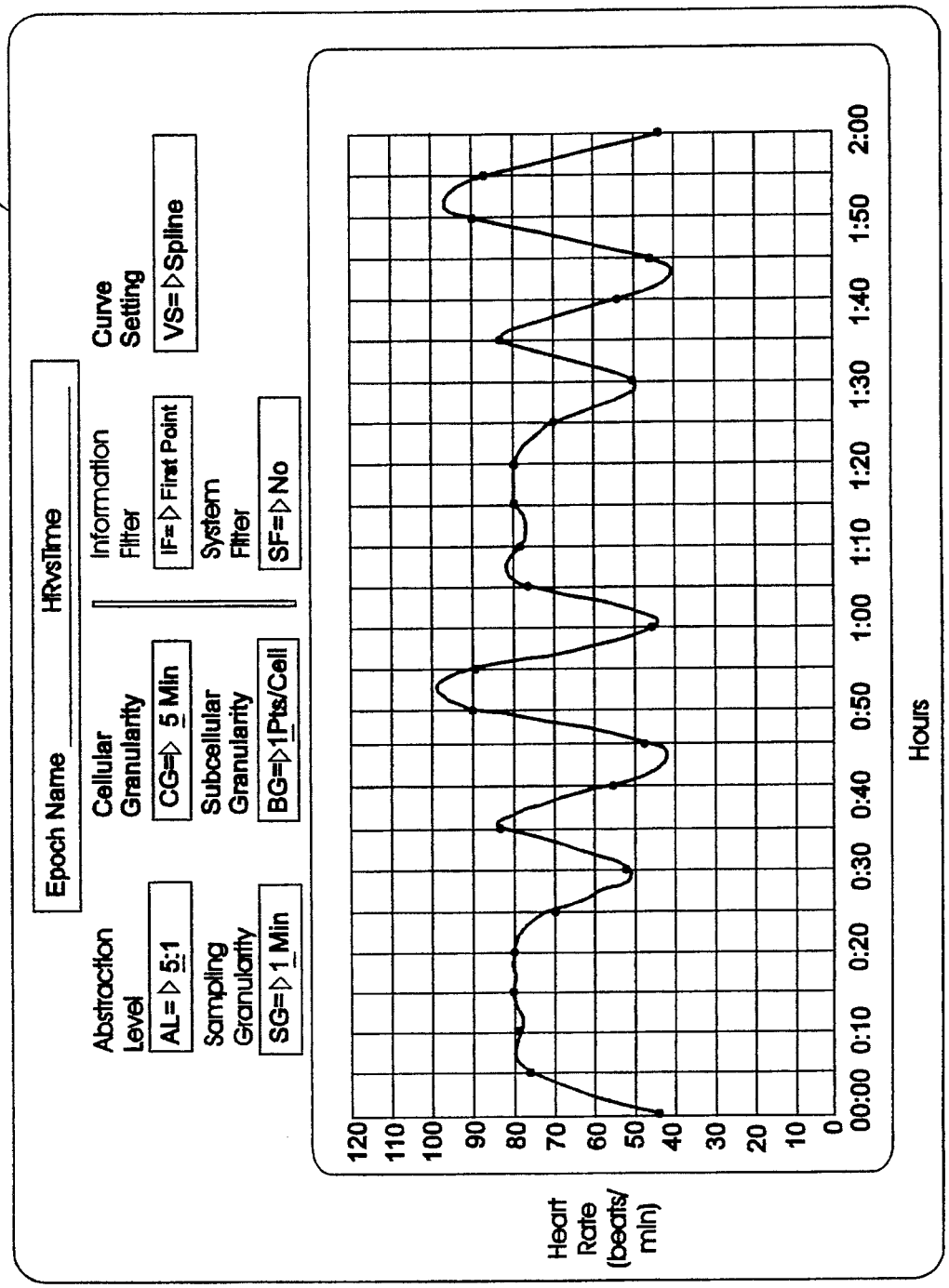
FIG. 5 illustrates a data visualization technique of the illustrated embodiment in which medical data is plotted on a display screen utilizing the "Spline" curve setting.

Client 200 is capable in the illustrated embodiment of dynamically setting the value of Curve Setting to one of three values: (1) Data Only; (2) Connect; or (3) Spline. FIGS. 3–5 illustrate the data visualization techniques of the illustrated embodiment in which medical data ("Heart Rate/Time") is plotted on display screen 101 utilizing the "Data Only", "Connect" and "Spline" parameters, respectively.

Client 200 is capable of dynamically specifying local, context-dependent data subsets or Epoch Boundaries. Data within each epoch is then processed based upon Client 200 specified, epoch-specific values of AM 206. Additionally, multiple epochs may be simultaneously delineated as required. Epochs are stored in an epoch data base as an axis-specific name and axis-dependant start and end boundaries. In the preferred embodiment, the epoch data base is stored within a memory storage device, which for example may be RAM.

As has been previously introduced, RDS 203 is visualized according to the dynamically-specified abstraction level. The abstraction level varies from epoch to epoch, and is a function of both Cellular Granularity and Subcellular Granularity, i.e. abstraction level=(Cellular Granularity)/(Subcellular Granularity*Sampling Granularity). In particular, the abstraction level is directly proportional to Cellular Granularity, i.e., as Cellular Granularity increases, the data magnitude for an individual grid cell increases. This corresponds to a decrease in the per-cell data density. The "coarseness" of the visualized information increases, corresponding to an increase in the abstraction level. In contrast, the abstraction level is inversely proportional to Subcellular Granularity: as Subcellular Granularity increases, the number of data points visualized per grid cell increases. The "coarseness" of the visualized information decreases, corresponding to a decrease in the abstraction level. It should be noted that as Subcellular Granularity increases, it eventually reaches a value where the number of points per grid cell equals the underlying pixel density of the hardware platform. If Client 200 has the System Filter abstraction metric set to "OFF", increases in Subcellular Granularity above this maximum value would result in information hiding by the system secondary to Client 200's request to visualize more information per grid cell than is allowable by the hardware platform and is accordingly not allowed.

The specifics of the data visualized, i.e., which points from the underlying data set are actually placed on the screen, are determined directly by the values of the Filter Setting and Curve Setting, and indirectly by the boolean value of the System Filter. Specifically, if data are abstracted upward relative to RDS 203, Client 200 is required to indicate which information filter is to be applied to produce the data abstraction/information hiding, as each information filter produces a different resultant visualization of the abstract data. The abstraction level is therefore a measure of data abstraction and is a function of Cellular Granularity, Sampling Granularity and Subcellular Granularity.

Figure 6:
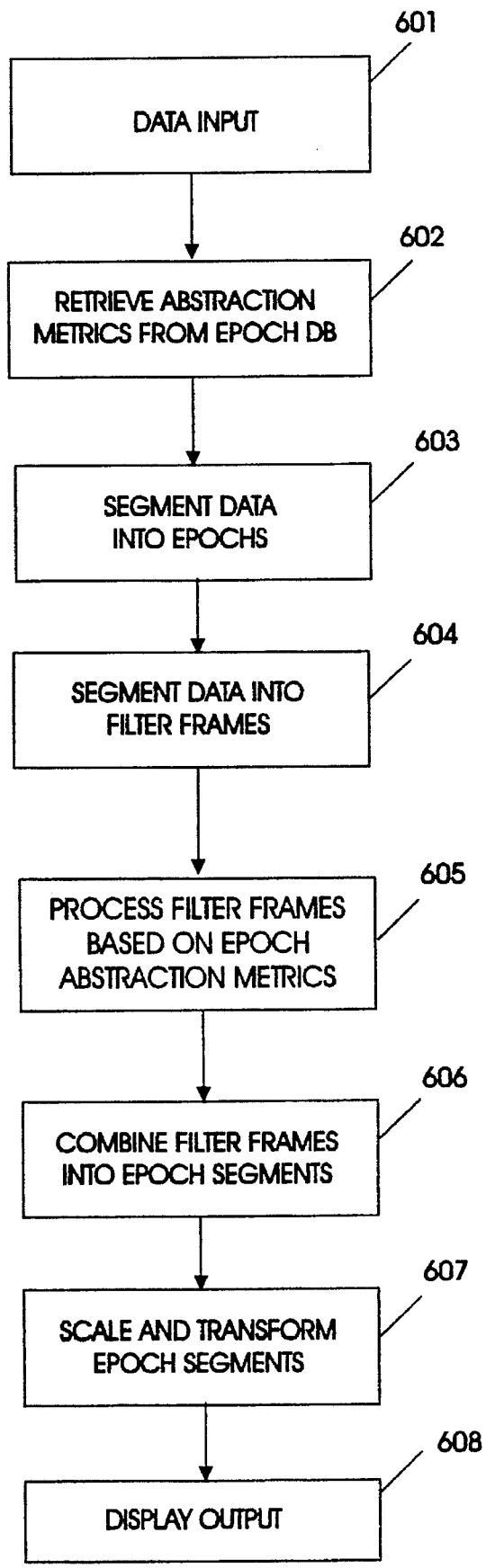
FIG. 6 illustrates a flow diagram of a method of the invention as carried out within the architecture of FIG. 2.

FIG. 6 illustrates a flow diagram of one method of the invention as carried out within the architecture of FIG. 2. Recall that both RDS 203, which is an input data set, and data visualization commands are received from Client 200 (block 601). Recall further, that in the illustrated embodiment, the data visualization commands are interactively received and they are operable to selectively enable one or more of a plurality of selectable information processing parameters, or abstraction metrics, stored in the epoch data base (block 602). The selectable information processing parameters include both filters and algorithms, both of which have been previously introduced and will be described in greater with reference to FIGS. 9–25. As RDS 203 passes through ICSVA 204, ICSVA 204, in response to the received data visualization commands, selectively delineates one or more circumscribed, context-sensitive data subsets within RDS 203, which in the illustrated embodiment include segmenting RDS 203 into epochs (block 603) and then into filter frames (block 604). Each filter frame including of one or more datum. ICSVA 204 then processes and abstracts RDS 203 utilizing selected information processing parameters which were interactively and dynamically specified by Client 200 (block 605). Once all the filter frames for an epoch have been processed, the filter frames are combined into epoch segments (block 606), thereby generating an output data set. The output data set is then passed as line-drawing primitives to a drawing program resident to the processing platform (607). The output data set is then displayed to data visualization screen, 205 (block 608).

In summary, the processing of RDS 203 as depicted through blocks 601–608 of FIG. 6 constitute physical process steps implementing dynamic interactive strategies for specifying and applying information parameters to RDS 203 during visualization. As is evident, a raw unprocessed data set is received by ICSVA 204 (block 601) and following a physical transformation (blocks 602–606), a processed output data set is produced and subsequently displayed (block 607–608). These strategies collectively comprise the visualization methodology of the preferred embodiment of the invention.

Figure 7:
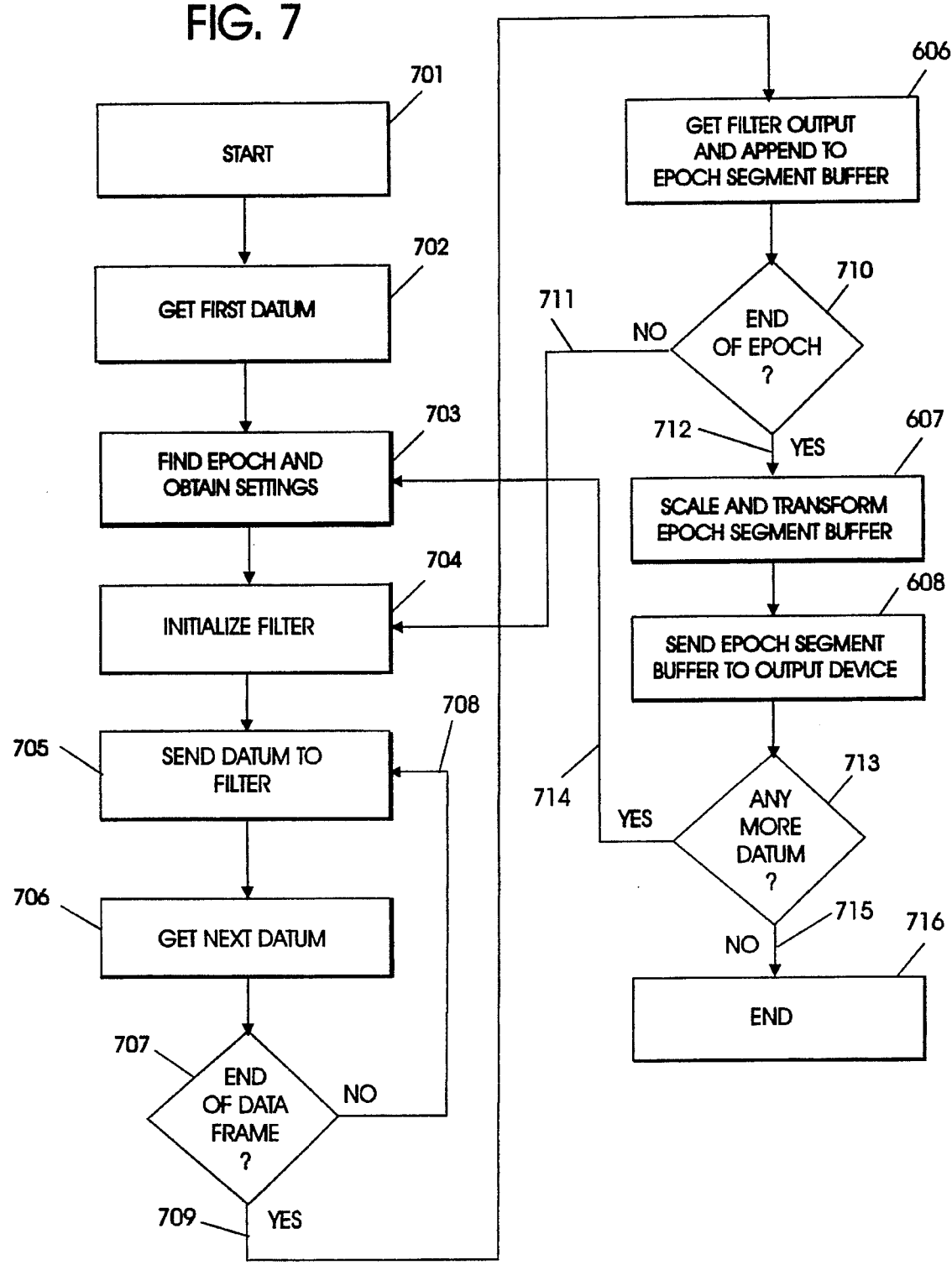
FIG. 7 illustrates a more detailed flow diagram of process block 605 of FIG. 6.

Turning to FIG. 7, there is illustrated a more detailed flow diagram of blocks 605–608 of FIG. 6. Upon entering block 605, processing of RDS 203 is begun (block 701), and a first datum is received for processing (block 702). The epoch data base is accessed to retrieve the parameters presently associated with the first datum (block 703). Recall, that Client 200 may interactively and dynamically input visualization commands altering the display of any one or more data sets. Utilizing the retrieved parameters, selected information processing algorithms and filters are enabled and initialized (block 704). The enabled information processing filters and algorithms then receive the first datum as input (block 705). As the enabled information processing filters and algorithms process the first datum, a second datum is received for processing (block 706). If the second datum is a member of the same filter frame as the first datum (decisional block 707), then the second datum is input to enabled information processing filters and algorithms for processing (branch 708 to block 705) while processed first datum is output to temporary storage.

If the second datum is not a member of the same filter frame as the first datum (decisional block 707), then the processed filter frame output temporarily stored is retrieved and temporarily stored in an epoch segment buffer (branch 709 to block 606). If the filter frame processing output does not represent the last filter frame encompassing the present epoch segment (decisional block 710), then utilizing the previously retrieved epoch parameters, selected information processing algorithms and filters are re-enabled and re-initialized for processing the next filter frame (branch 711 to block 704).

If the filter frame processing output does represent the last filter frame encompassing the present epoch segment (decisional block 710), then the present epoch segment, stored in the epoch segment buffer, is scaled and transformed (branch 712 to block 607). The scaled and transformed epoch segment is sent to the visual display screen (block 608). If there is at least one other datum to be processed (decisional block 713), then the epoch data base is re-accessed to retrieve the parameters presently associated with the next datum (branch 714 to block 703). If there are no other datum to be processed (decisional block 713), then processing ends (branch 715 to block 716).

Turning now to FIGS. 8–25, there is illustrated an example of one implementation of the invention wherein received RDS 203 is medical data, noting that the visualization methodology of the invention is not restricted to application in this domain. The above-referenced figures present multiple visualizations of a typical raw data set of heart rate values in beats per minute sampled once per minute. Accordingly, RDS 203 has a Sampling Granularity value for the x-axis (Time) of one data point per minute, and a For the y-axis (Heart Rate in beats per minute), the Sampling Granularity value is 1 beat/minute. Throughout the example, all abstraction metric (via AM 206) adjustments are made on the x-axis only. Thus, for the sake of clarity, AM 206 value boxes pictured at the top of each of the FIGS. 8–22 simply name the specific abstraction metrics without indicating the axis to which they apply. A solid black triangle appearing to the left of a value indicates that a choice list of possible values exists. Alternatively, numeric values with solid lines at their base may be modified directly by either writing with a stylus or typing from a keyboard. Modifiable fields on the left side of the central bar include AL and the three abstraction metrics which directly contribute to the value of AL, i.e. Cellular Granularity, Sampling Granularity and Subcellular Granularity. Note that AL can be either automatically computed following a change in Cellular Granularity and/or Subcellular Granularity, or be directly modified, in which case Cellular Granularity and Subcellular Granularity are adjusted to obtain the desired AL value. The abstraction metrics to the right of the central bar are not directly linked to the calculation of AL, i.e. Information Filters, System Filter, and Curve Setting. The value of the final abstraction metrics Epoch Boundaries (illustrated in this example as "Epoch Name") is centered above the display of the other abstraction metrics. Note, if no local Epoch Boundaries have been defined, the Epoch Name field is set to the name of the received raw data set, in this example, RDS 203 is "Hours versus Time". Essential to a cogent understanding of this example is that the visualizations are based upon a hypothetical piece of visualization hardware with a pixel density of 15 pixels per graph cell. Therefore, for FIGS. 8–22, attempts to plot more than 15 points per grid cell triggers a boundary condition resulting in a check of the value of the System Filter. For the example, as previously introduced, System Filter is set to "OFF" while operating under environment established by the invention. Thus, any attempt to visualize more than 15 points per grid cell will result in mandatory information hiding via a client-selected information filter.

Figure 8:
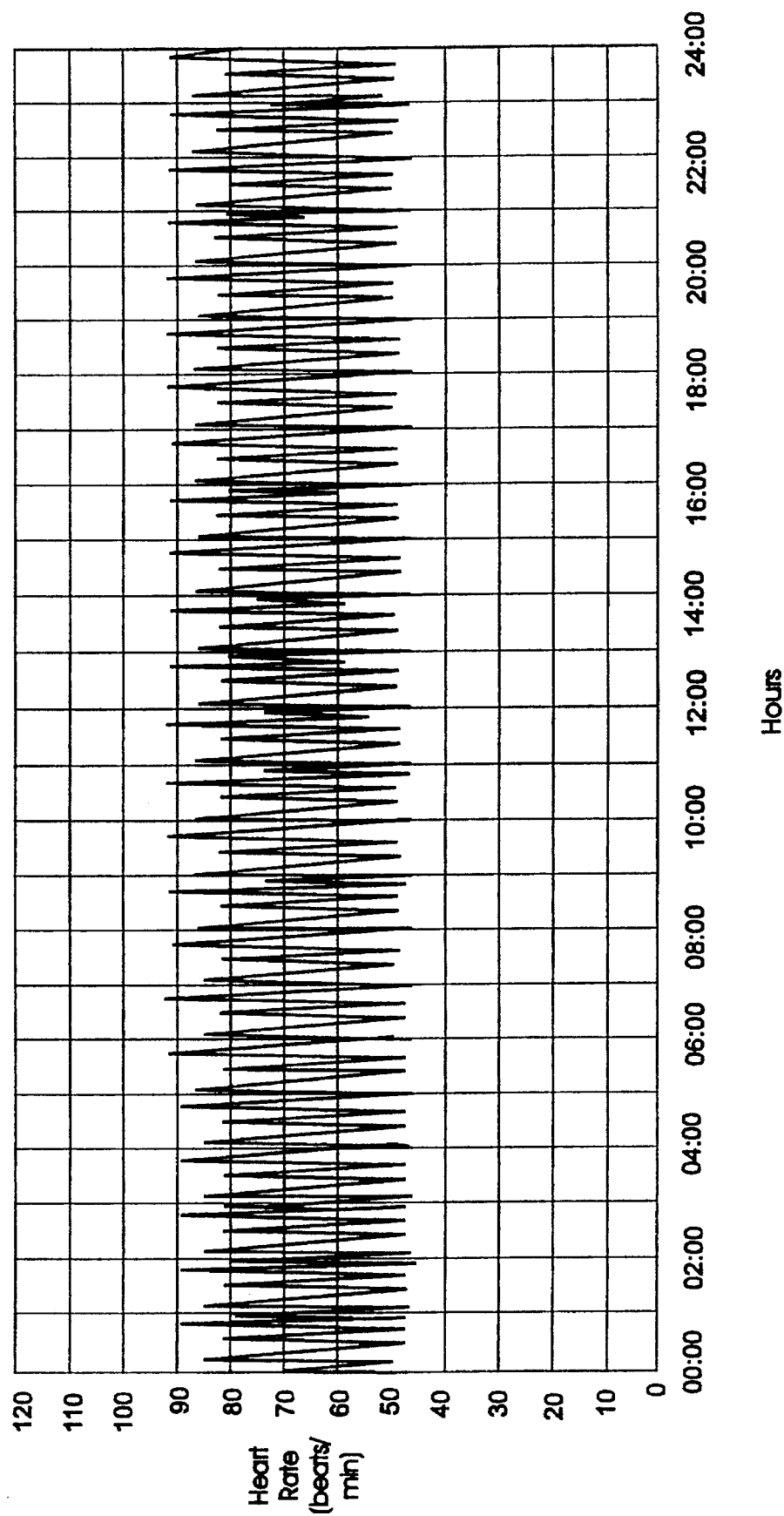
FIG. 8 illustrates a prior art visualization of an example data set.

FIG. 8 illustrates a prior art visualization of the entire data set utilized in this example. The illustrated data values represent a 24-hour period of 1440 points (60 points per hour for 24 hours).

Figure 9:
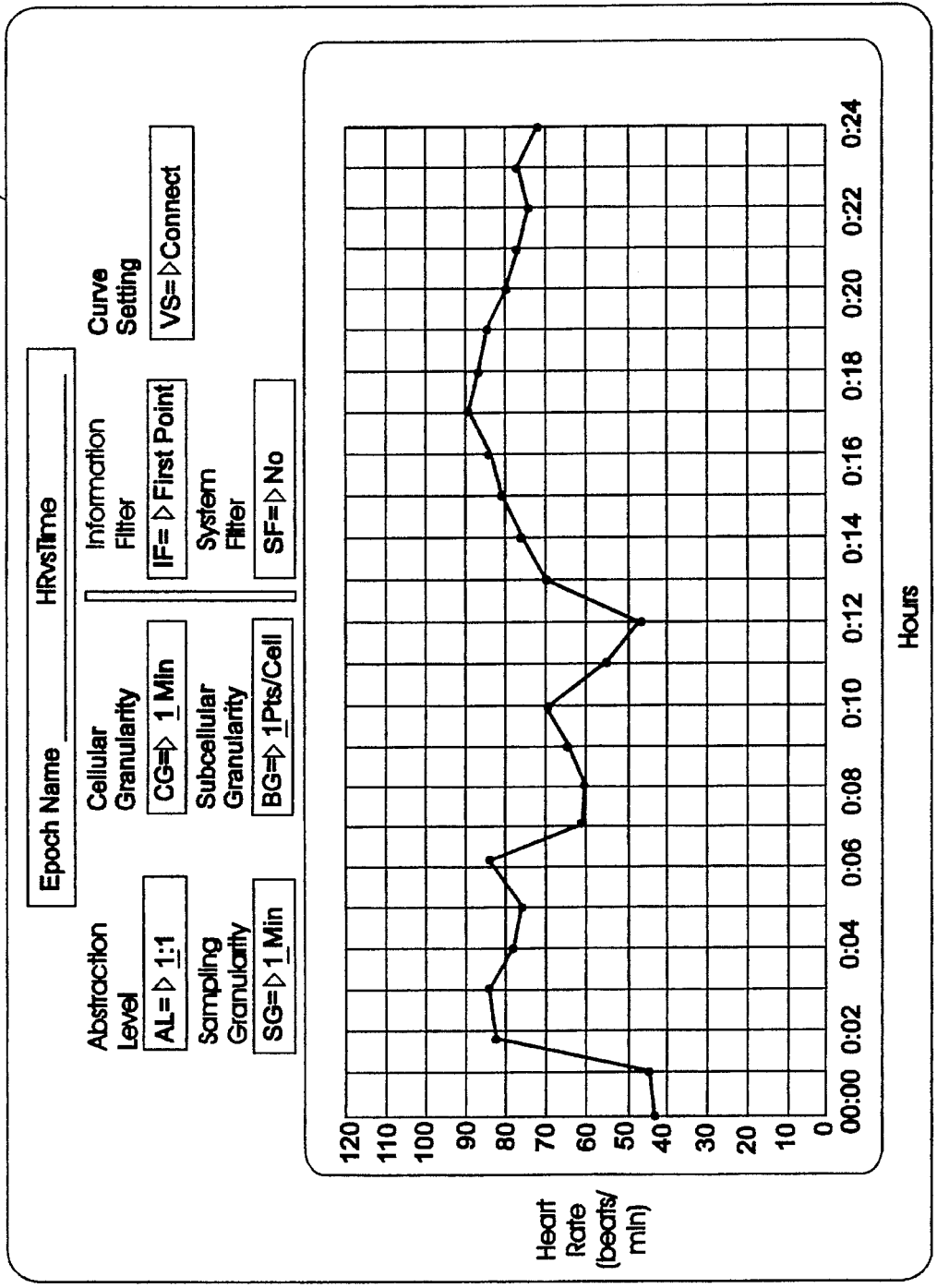
FIG. 9 illustrates the first 24 minutes of the example data set shown in FIG. 8 as visualized by the illustrated embodiment.

FIG. 9 illustrates the first 24 minutes (Cellular Granularity=1 minute) of the data set shown in FIG. 8, note that there is no downward abstraction of data in this illustration, i.e., no information hiding. Note further, that Subcellular Granularity has been forced/defaulted by the processing system to 1 minute. This figure therefore shows a visualization of the first 24 points in the data set. Because the magnitude of each grid cell is equal to the Sampling Granularity of the reference data set, the system forces Subcellular Granularity to 1 point per cell. The lack of information hiding is indicated by the "grayed-out" value in the Information Filters box. The data is visualized utilizing curve setting algorithm "Connect" (Curve Setting).

Figure 10:
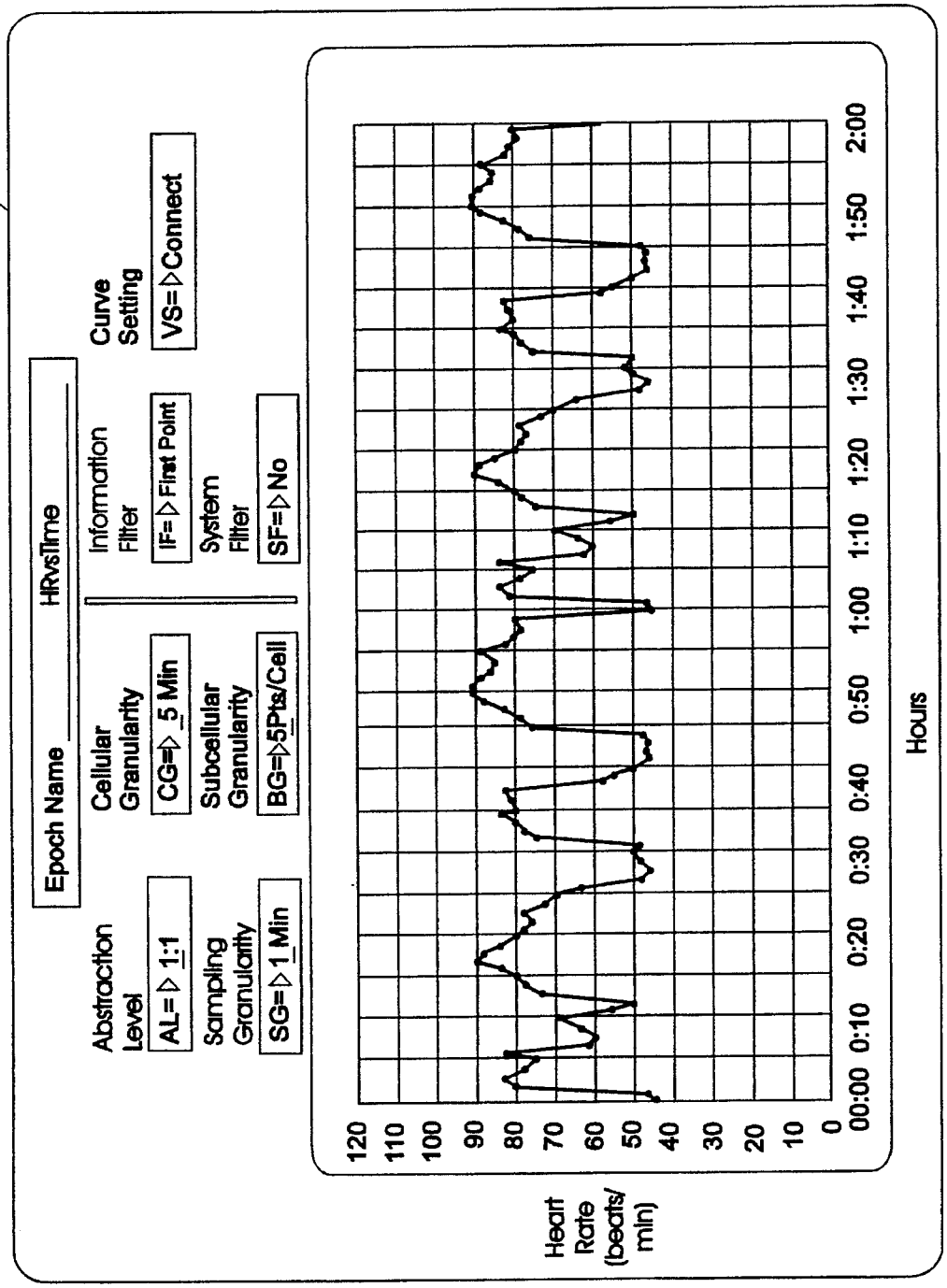
FIG. 10 illustrates the first two hours of the data set shown in FIG. 8 as visualized by the illustrated embodiment.

FIG. 10 illustrates the first two hours of the data set shown in FIG. 8. This adjustment is responsive to Client 200 increasing the value of Cellular Granularity from 1 minute to 5 minutes. Again, there is no downward abstraction of data in this illustration, and Subcellular Granularity has been forced/defaulted by the processing system to 5 points per grid cell. Thus, there is illustrated the same visualization as that shown in FIG. 9 except the Cellular Granularity value has been increased from 1 to 5 minutes, based upon Client 200 specified value of Cellular Granularity.

Figure 11:
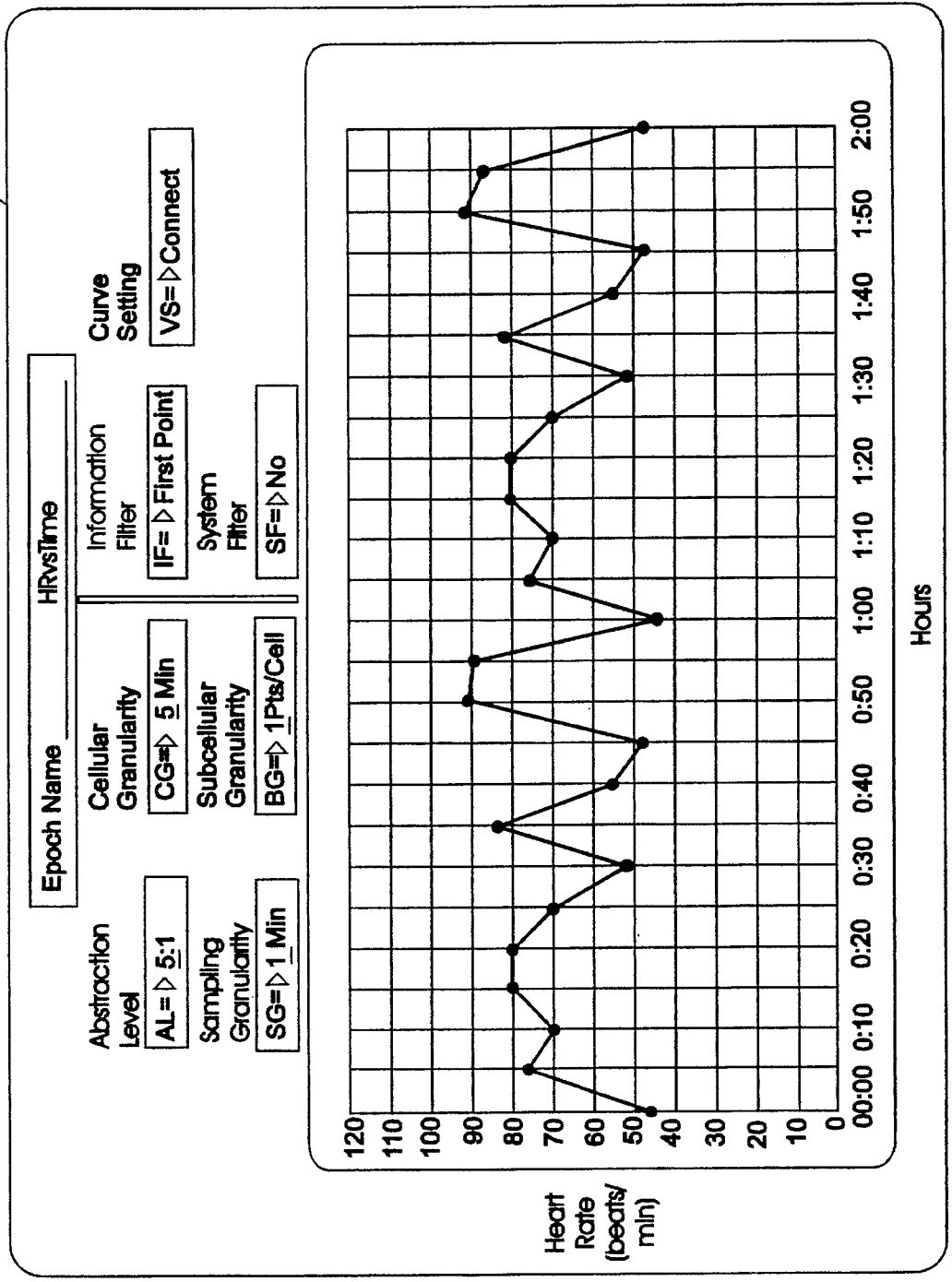
FIG. 11 illustrates the data set shown in FIG. 10 as visualized by the illustrated embodiment wherein information is hidden via curve setting algorithm "Connect"

FIG. 11 illustrates the first two hours of the data set, as shown in FIG. 10, however, Subcellular Granularity has been reset from 5 to 1. By lowering the value of Subcellular Granularity from 5 to 1, Client 200 has indicated that information is to be hidden, i.e. data is to be downwardly abstracted as indicated by the Abstraction Level equal to 5:1. In the illustrated embodiment, the downward abstraction is accomplished by the First Point information filter. The Information Filters are enabled by the system when the abstraction level is greater than 1, whereas the First Point information filter has been selected by the user. Note that the visualized data continues to utilize curve setting algorithm, Curve Setting="Connect", which has not been altered in any of the previous examples.

Figure 12:
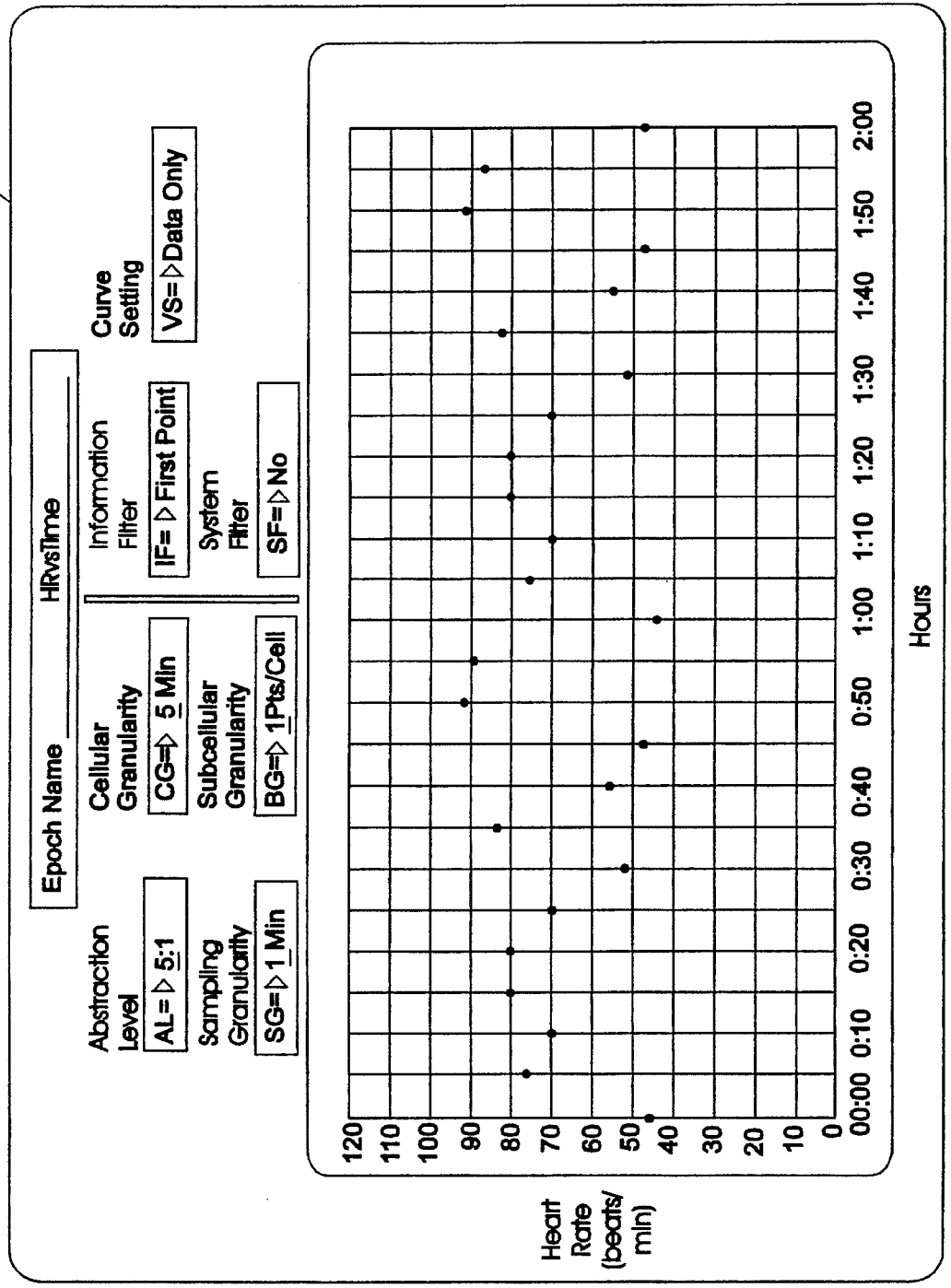
FIG. 12 illustrates the identical data visualization as that of FIGS. 10 and 11, however, the curve setting algorithm has been set to "Data Only"

FIG. 12 illustrates the identical data visualization as that of FIG. 11, however, Client 200 has modified the curve setting algorithm, setting Curve Setting="Data Only".

Figure 13:
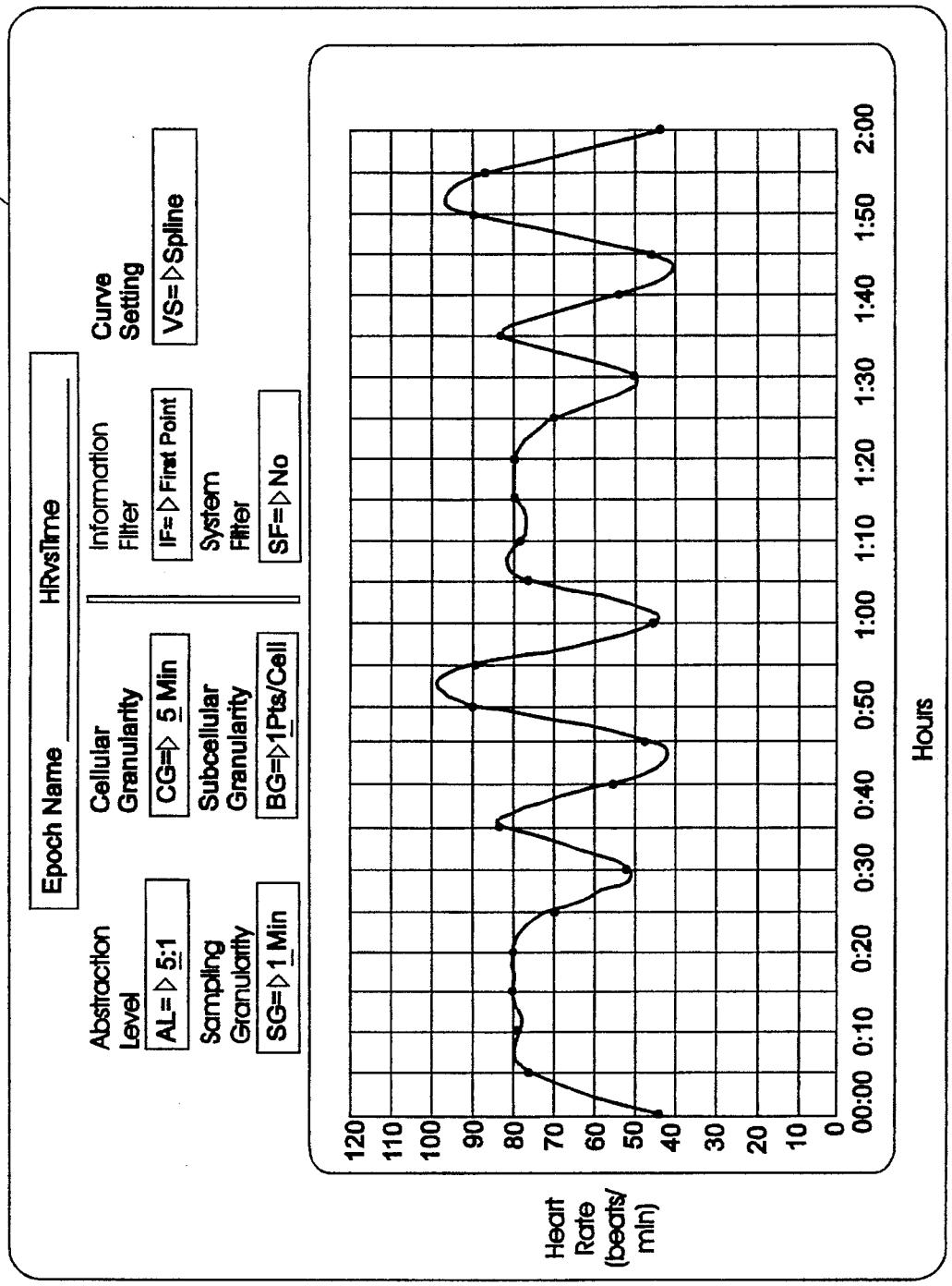
FIG. 13 illustrates the identical data visualization as that of FIGS. 10–12, however, the curve setting algorithm has been set to "Spline"

FIG. 13 illustrates the identical data visualization as that of FIGS. 11 and 12, however, Client 200 has modified the curve setting algorithm, setting Curve Setting="Spline".

Figure 14:
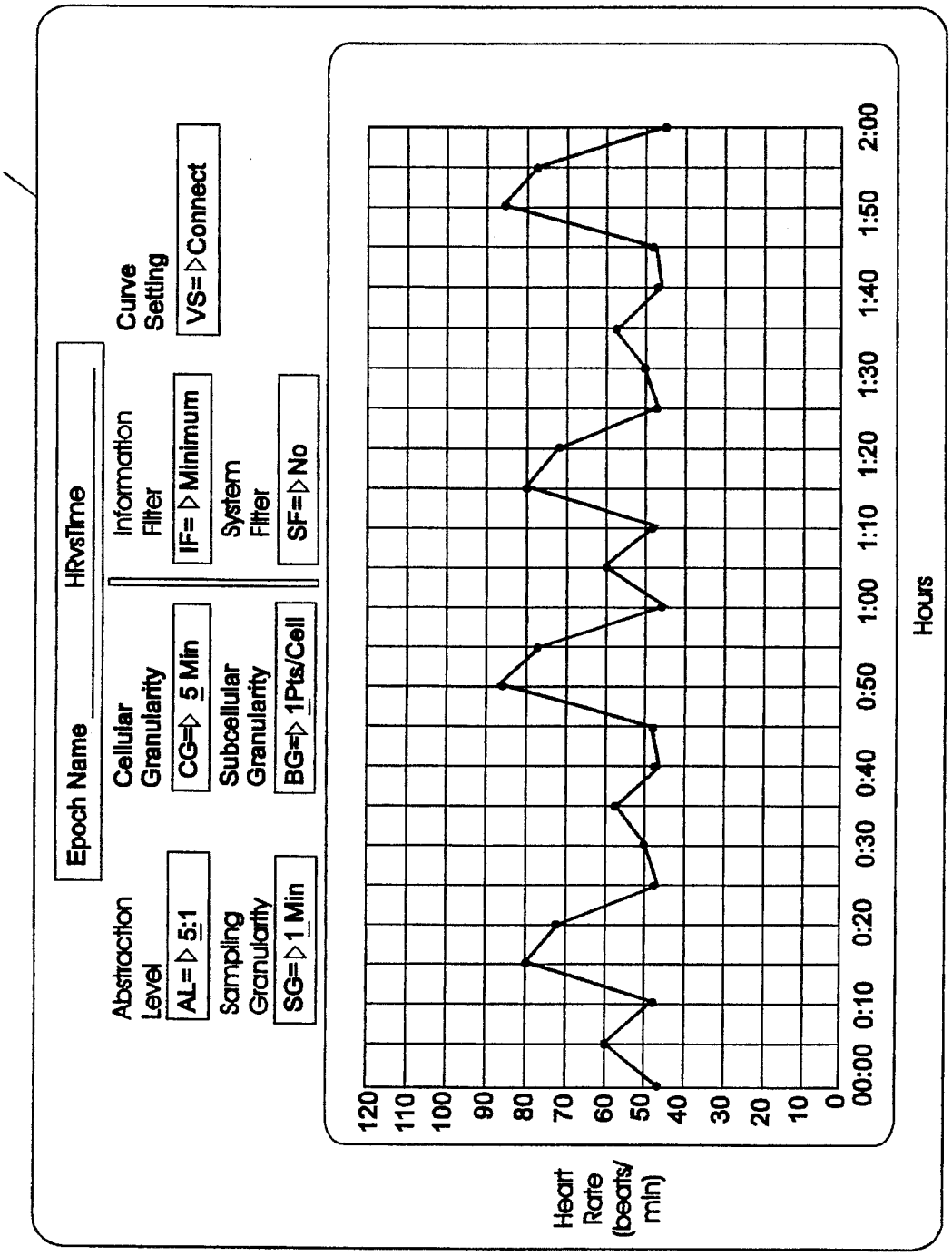
FIG. 14 illustrates the identical data visualization as that of FIG. 11, however, the information filter has been changed from "First Point" to "Minimum"

FIG. 14 illustrates the identical data visualization as that of FIG. 11, however, Information Filters has been changed from First Point to Minimum. Comparing FIGS. 11 and 14 illustrates a liberal change in the quality of data downwardly abstracted, emphasizing a technical advantage of the invention, that the utilization of information filters enable Client 200 to interactively determine how information is hidden/abstracted.

Figure 15:
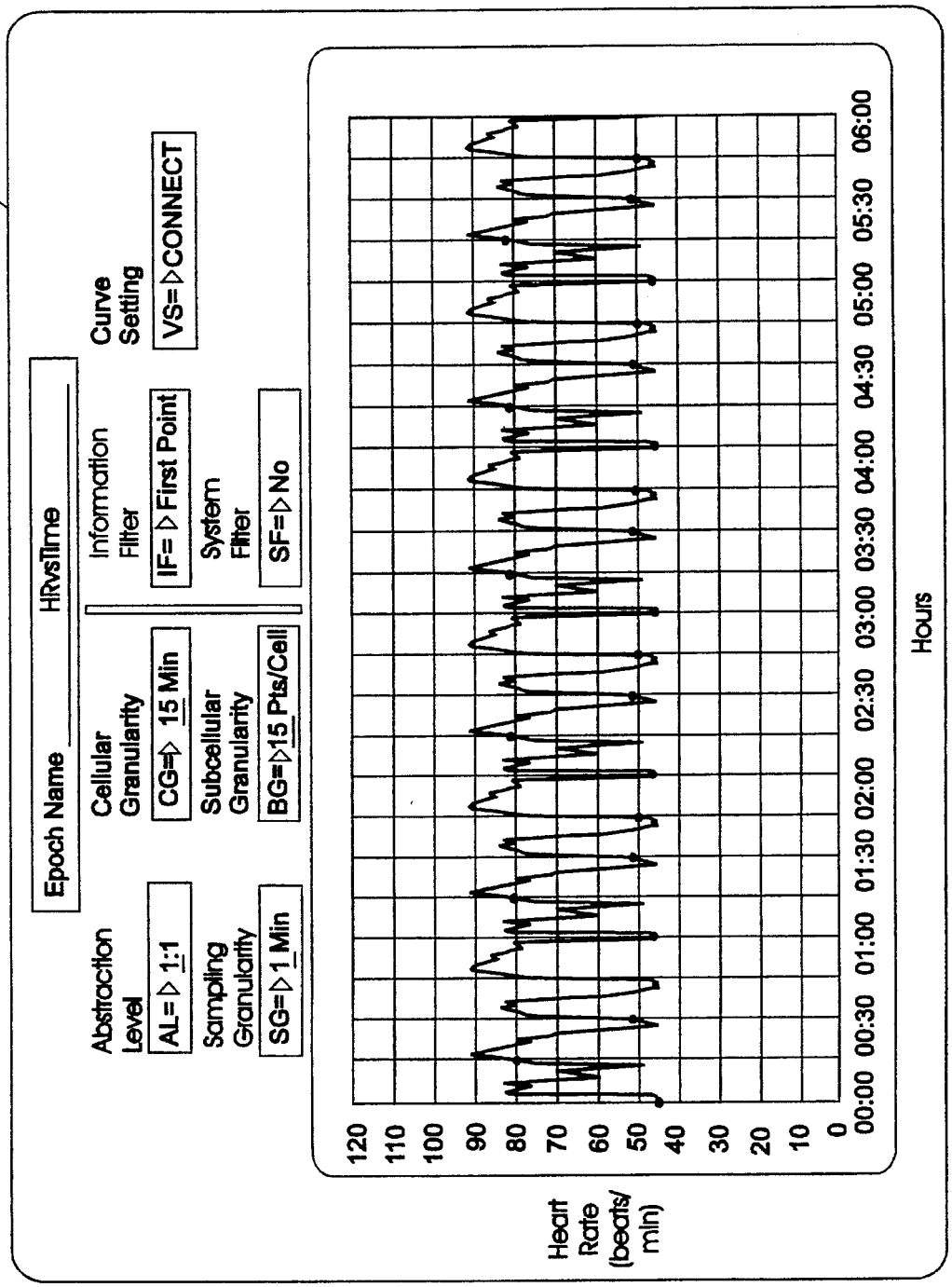
FIG. 15 illustrates the first six hours of the data set shown in FIG. 8, however, cellular granularity has been changed to equal 15 minutes and subcellular granularity has been changed to equal 15 points per grid cell.

FIG. 15 illustrates the first six hours of the data set shown in FIG. 8. This adjustment is made by Client 200 by changing Cellular Granularity to equal 15 minutes and Subcellular Granularity to equal 15 points/cell to visualize all data for the first 6 hours. Again, there is no information hiding as this figure shows a visualization at the highest data density allowable, i.e. 15 points per grid cell as indicated by the Abstraction Level equal to 1:1. Note that at this data density level, individual data points are no longer discernible.

Figure 16:
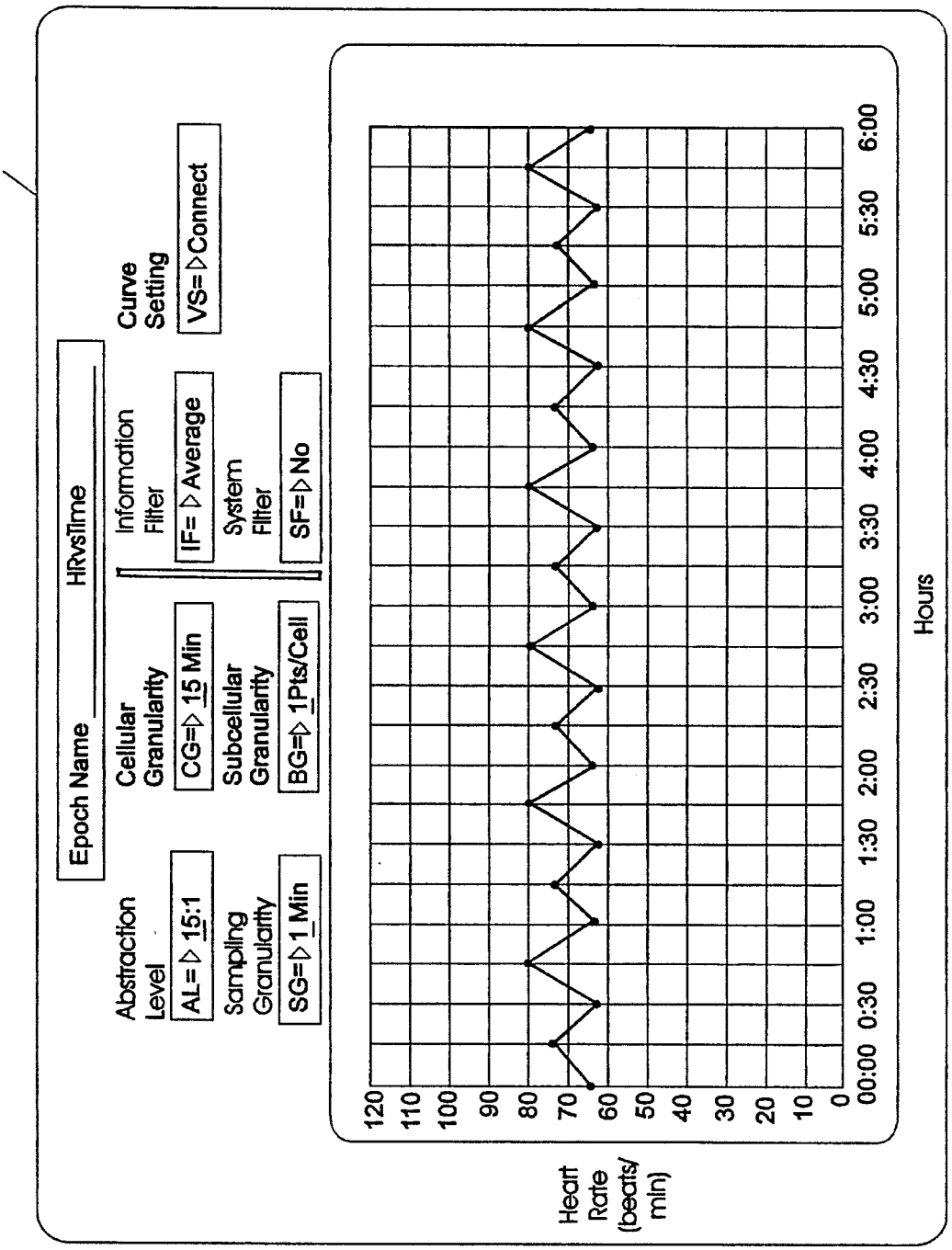
FIG. 16 illustrates the identical data set as that of FIGS. 15, however, subcellular granularity has been set equal to 1 causing information hiding via the "Average" filter.

FIG. 16 illustrates the identical data set as that of FIGS. 15, however, Client 200 has set Subcellular Granularity equal to 1 causing information hiding via the "Average" filter. This illustration shows how Client 200 can abstract information within grid cells of a given magnitude, i.e., Cellular Granularity remains constant at a value of 15, but Subcellular Granularity decreased from its maximum allowable value of 15 (based on hypothetical hardware restrictions and value of System Filter) to a value of 1, thereby initiating information hiding (abstraction).

Figure 17:
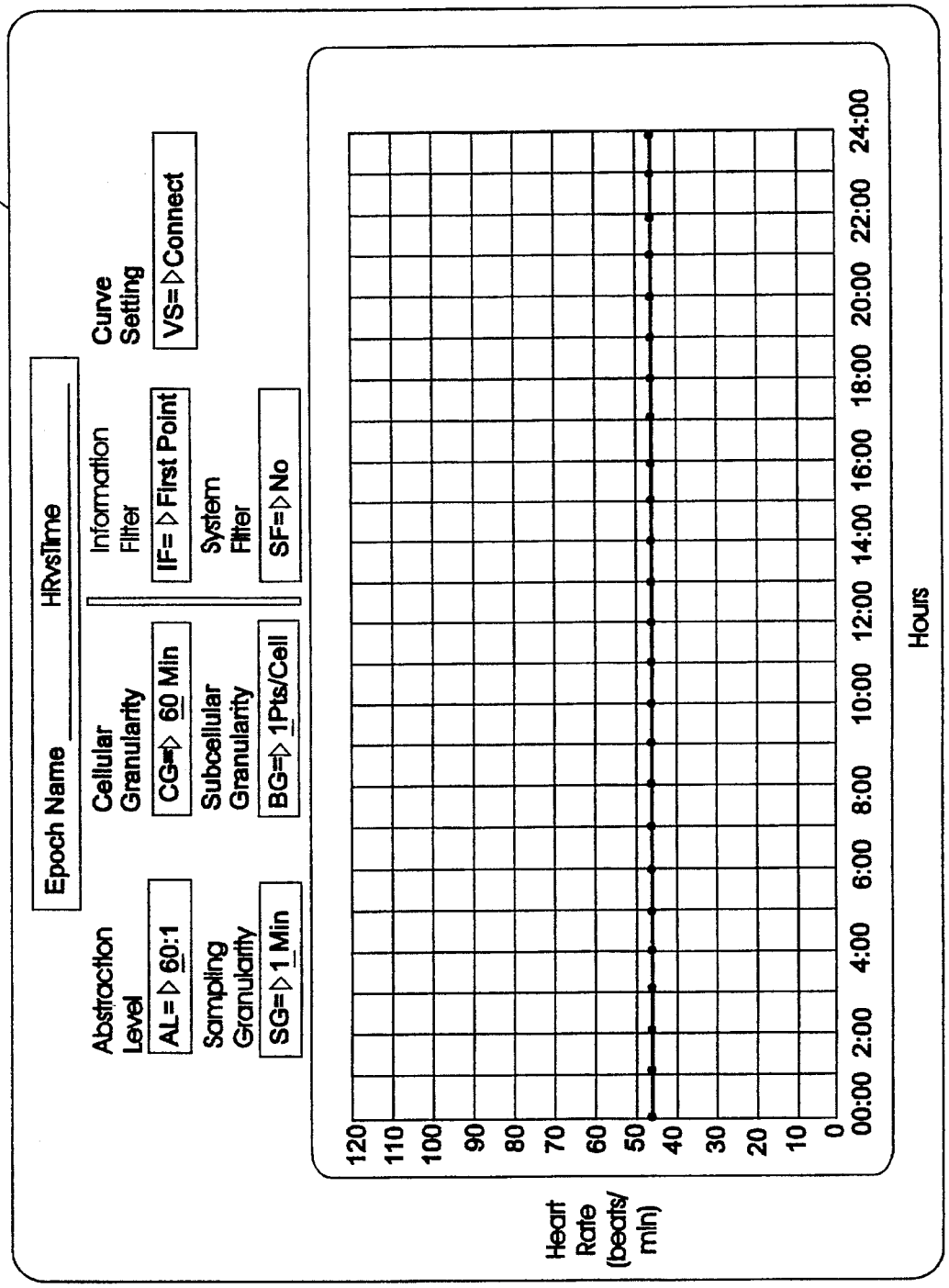
FIG. 17 illustrates all twenty-four hours of the data set shown in FIG. 8, however, that cellular granularity has been increased from 15 to 60 minutes, while subcellular granularity has been reduced from 15 to 5 points per grid cell causing further downward abstraction.

FIG. 17 illustrates all twenty-four hours of the data set shown in FIG. 8. Note, this illustration represents the highest level of data abstraction wherein Client 200 has first increased Cellular Granularity from 15 to 60 minutes per grid cell, and second, has reduced the Subcellular Granularity value from 15 to 1 points per grid cell causing a further downward abstraction. Client 200 has set Information Filters equal to First Point Filter. Since the 24 hour data set has been constructed by replicating a one hour data set 23 times in succession, the visualization which results from plotting the first point of each hour of data on a grid cell boundary is a straight line. Because of the cyclic nature of the 24-hour data set, all visualizations with Cellular Granularity equal to 60 and Subcellular Granularity equal to 1 will result in a straight line. The magnitude of the line differs depending upon the information filter chosen to abstract the data (e.g., the Average filter would produce a straight line which would lie parallel to and above that produced by the Minimum filter).

Figure 18:
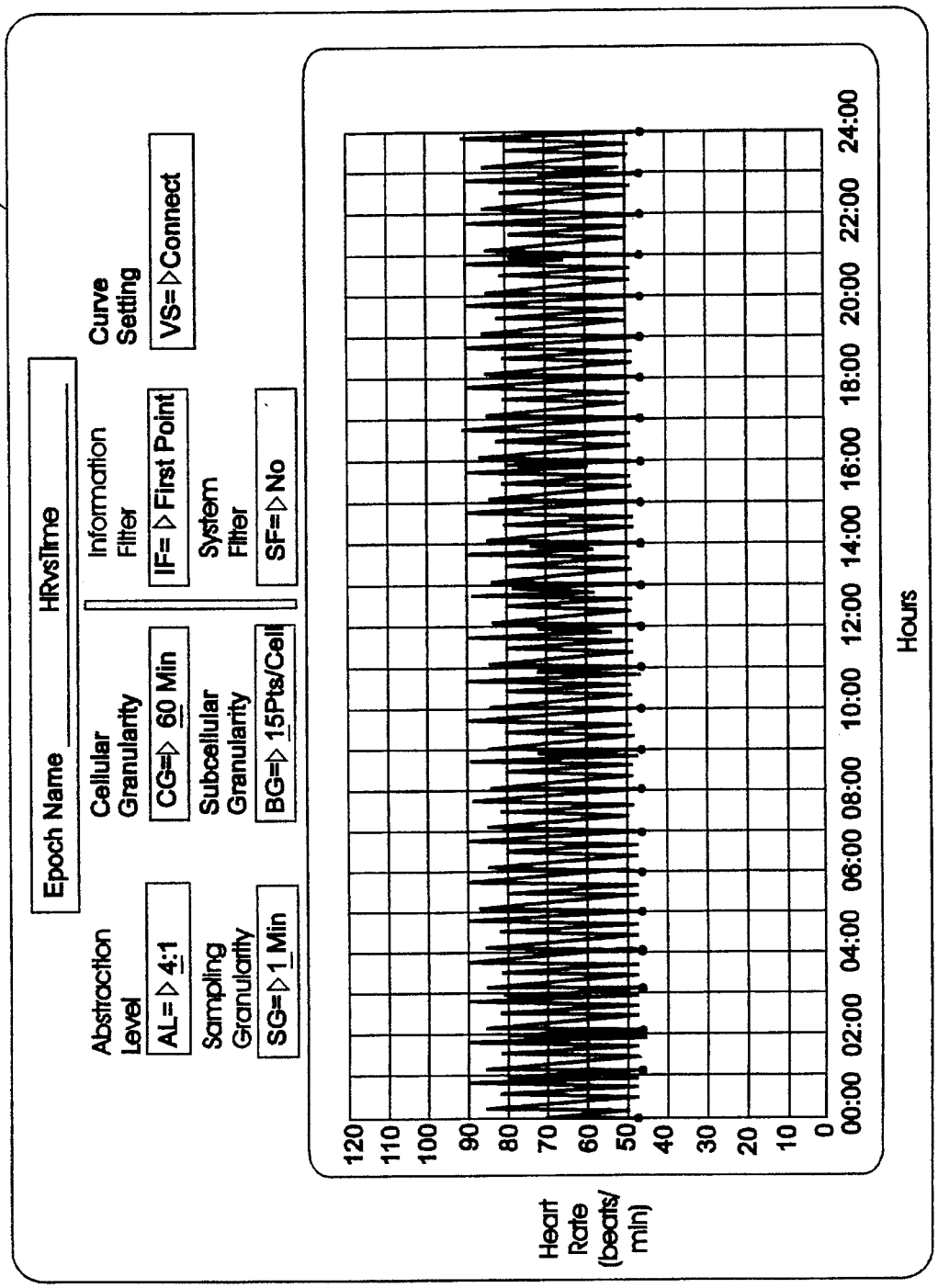
FIG. 18 illustrates the identical data set as that show in FIG. 17, however, subcellular granularity has been set equal to 15 points per grid cell and the "First Point" filter has been utilized to abstract groups of 4 points into a single point.

FIG. 18 illustrates the identical data set as that show in FIG. 17, however, Client 200 has set Subcellular Granularity equal to 15. In this visualization, the First Point filter is utilized to abstract groups of data (4 points in this illustration) into a single point. The effect of this data abstraction aspect is most clearly evident when comparing this illustration with FIG. 8.

Figure 19:
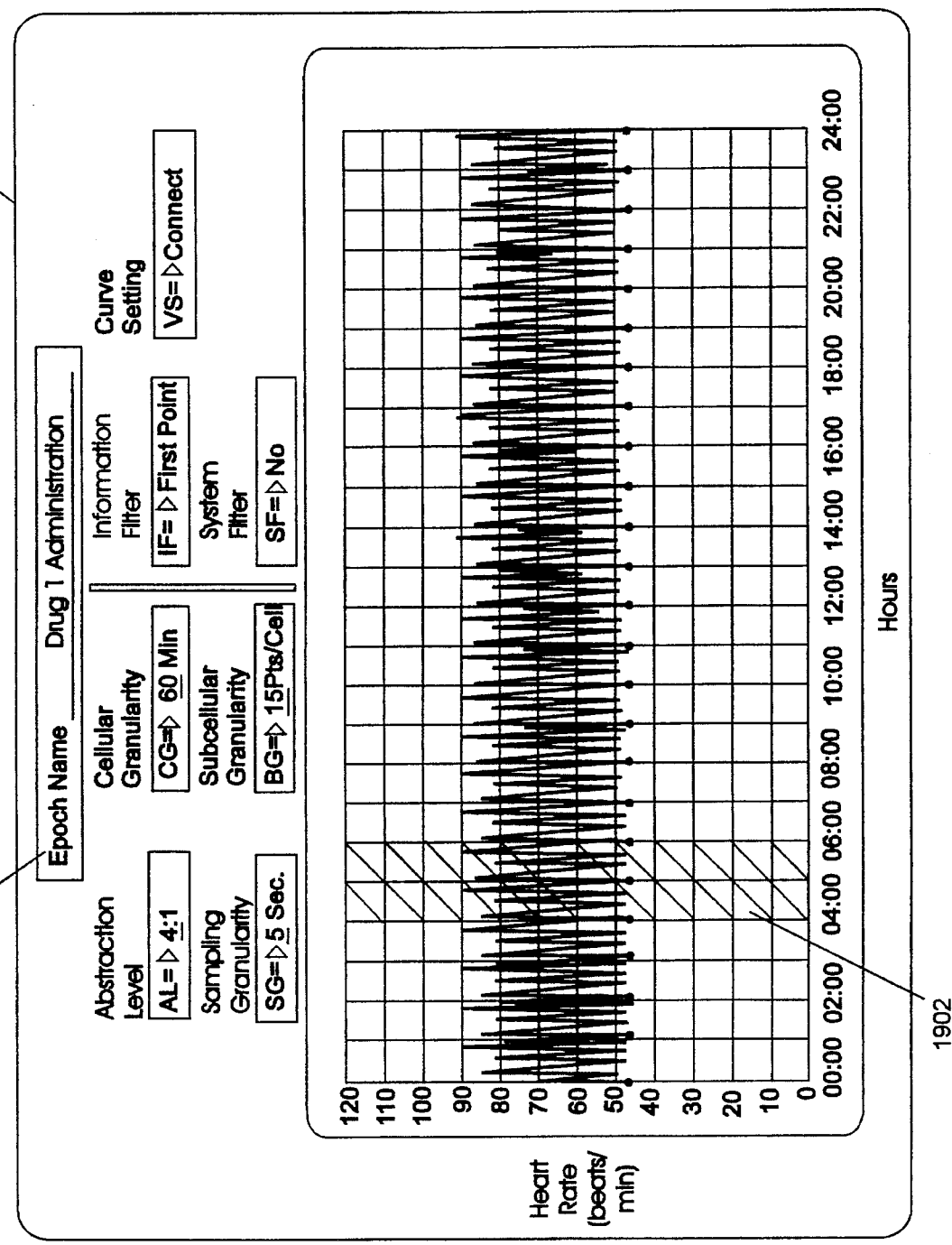
FIG. 19 illustrates the identical data set as that show in FIGS. 17 and 18, however, a first local epoch has been delineated along the x-axis.

FIG. 19 illustrates the identical data set as that show in FIGS. 17 and 18, however, Client 200 has delineated a local epoch named Drug 1 Administration 1902 (named interactively by Client 200 1901) on the x-axis, the boundary of local epoch 1902 lying between hours 4 and 6.

Figure 20:
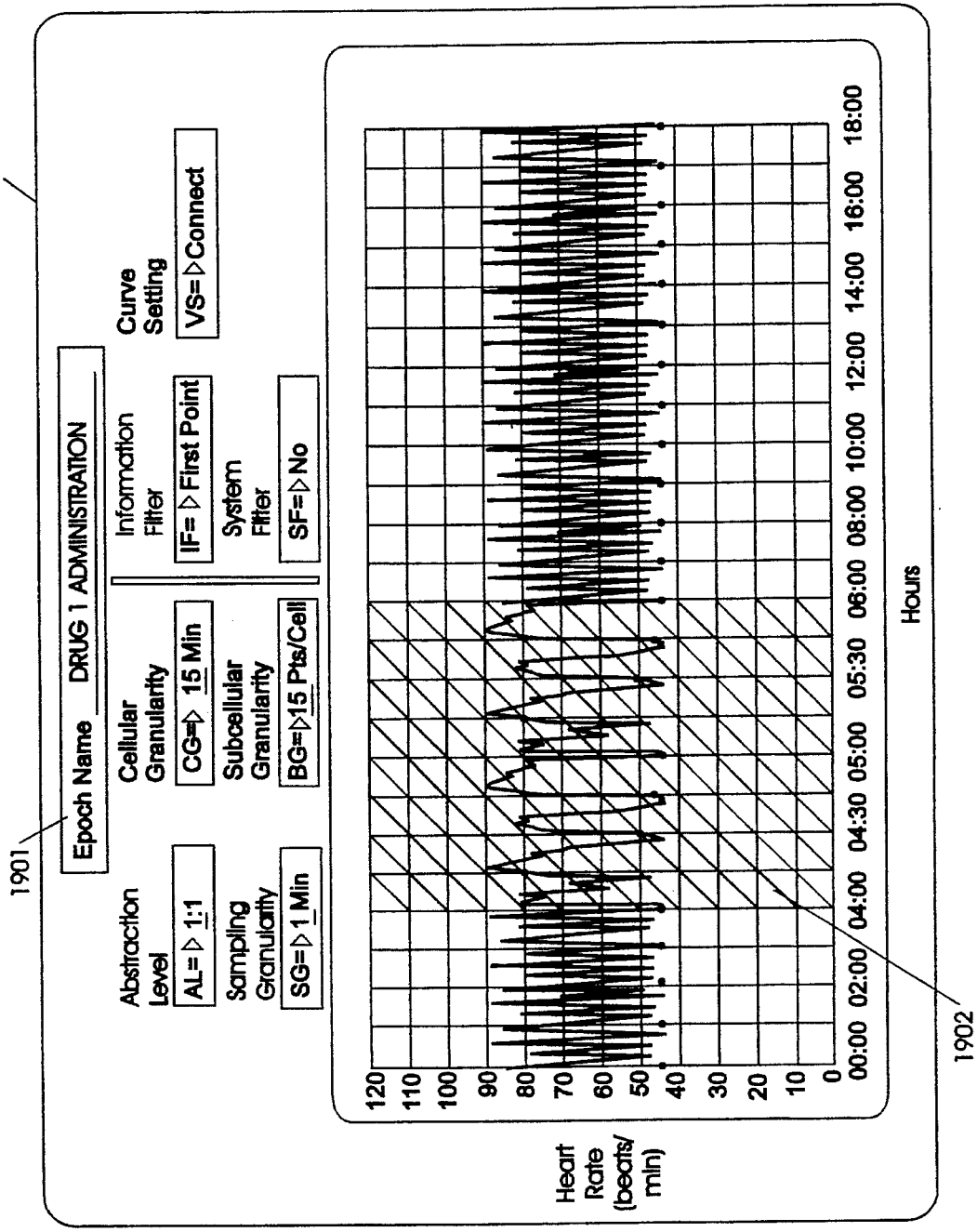
FIG. 20 illustrates the first eighteen hours of the data set shown in FIG. 8, however, the abstraction level of the first local epoch has been decreased by setting cellular granularity equal to 15.

FIG. 20 illustrates the first eighteen hours of the data set shown in FIG. 8, however, Client 200 has decreased the abstraction level of local epoch 1902 by setting Cellular Granularity equal to 15. Thus, Client 200 has elected to show information hidden in the previous visualization, FIG. 19, for local epoch 1902. This is accomplished by changing the value of Cellular Granularity for local epoch 1902 from 60 minutes to 15 minutes. Note again, that Subcellular Granularity is set equal to 15 enabling all raw data within the data set to be visualized, and therefore AL is equal to 1.

Figure 21:
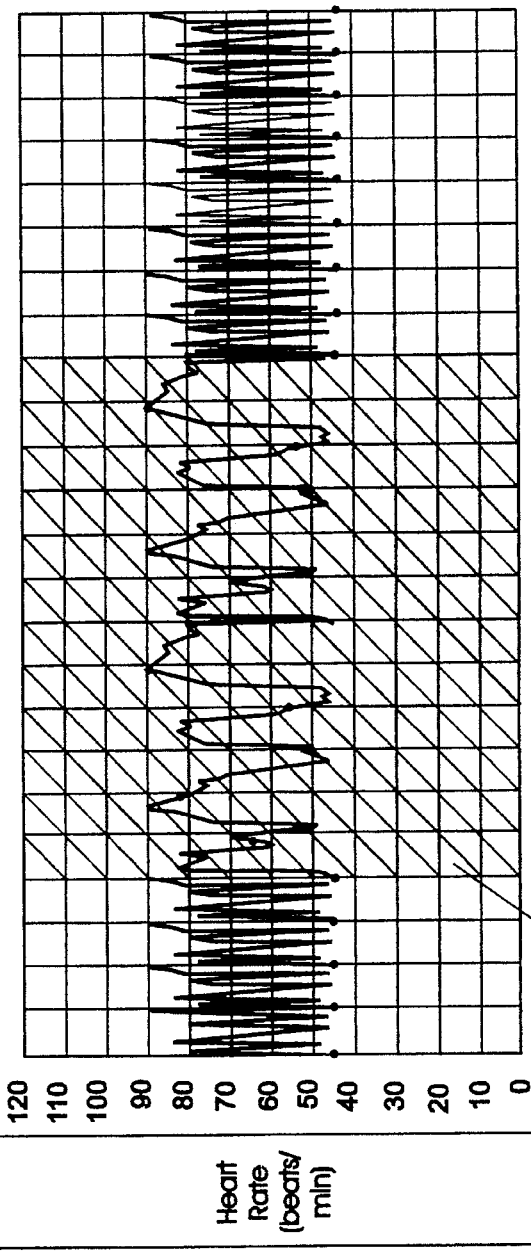
FIG. 21 illustrates the first fourteen hours of the data set shown in FIG. 20, however, the data visualized within the first local epoch has been "spread out" by reducing cellular granularity from 15 to 10 minutes.

FIG. 21 illustrates the first fourteen hours of the data set shown in FIG. 8, however, Client 200 has further "spread out" the data within local epoch 1902 by reducing Cellular Granularity from 15 to 10 minutes for Drug 1 Administration 1901. Given the underlying data density of the raw data and the hardware's maximum pixel density of 15 pixels per grid cell, note that processing system 100 has forced Subcellular Granularity equal to 10.

Figure 22:
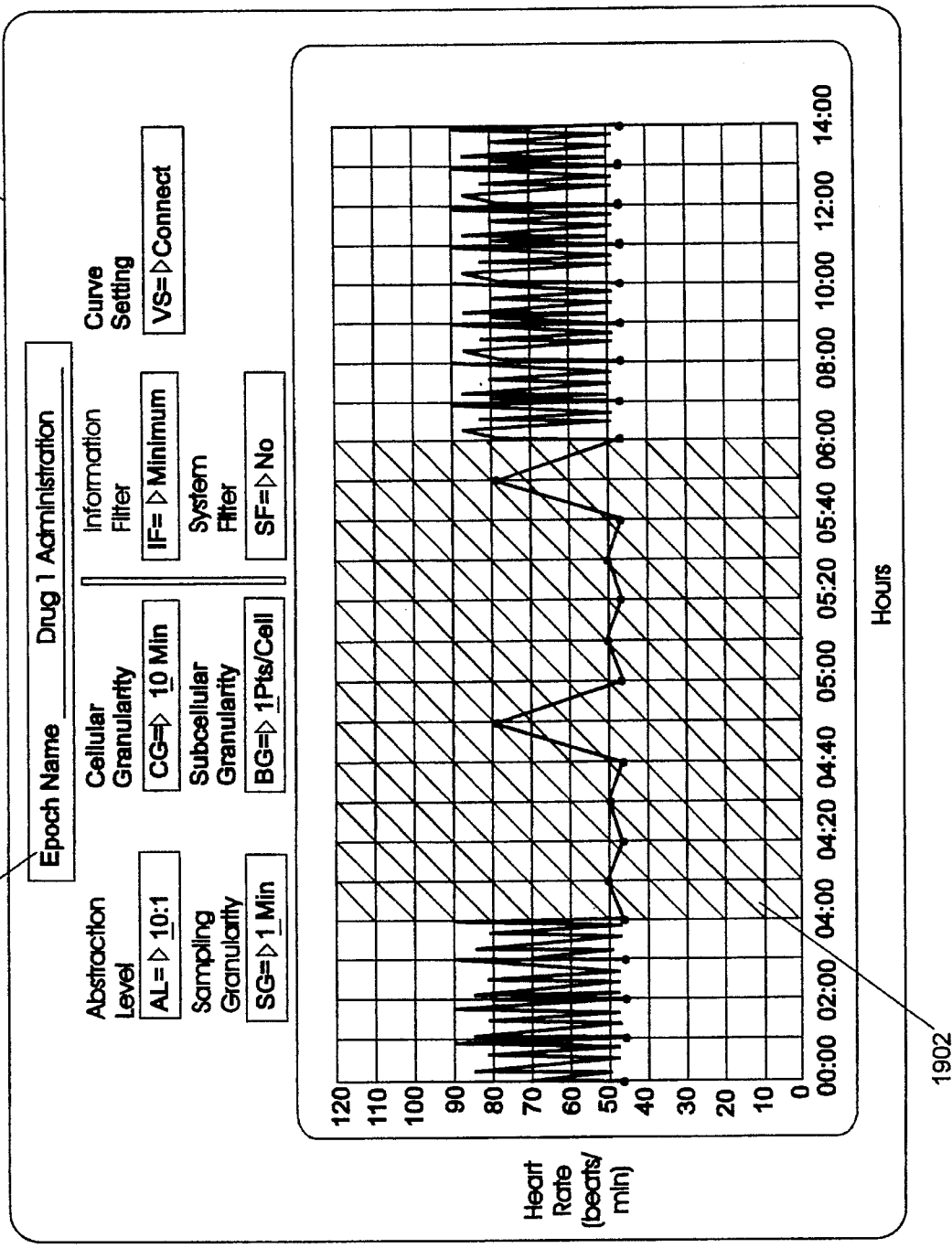
FIG. 22 illustrates the identical data set as that shown in FIG. 21, however, the information filter has been set equal to "Minimum" and subcellular granularity has been reduced to 1 point per grid cell for the local epoch only.

FIG. 22 illustrates the identical data set shown in FIG. 21, however, Client 200 has set Information Filters equal to Minimum thereby enabling the Minimum information filter for Drug 1 Administration epoch 1901. Note that Client 200 has reduced Subcellular Granularity to 1 point per grid cell. The reduction of the value of Subcellular Granularity forces information abstraction to occur within Drug 1 Administration epoch 1901 by reducing the 10 points per grid cell in the previous illustration, FIG. 21, to 1 point per grid cell in this illustration. The information hiding is completed by the application of the Minimum information filter and setting the Abstraction Level equal to 10:1.

Figure 23:
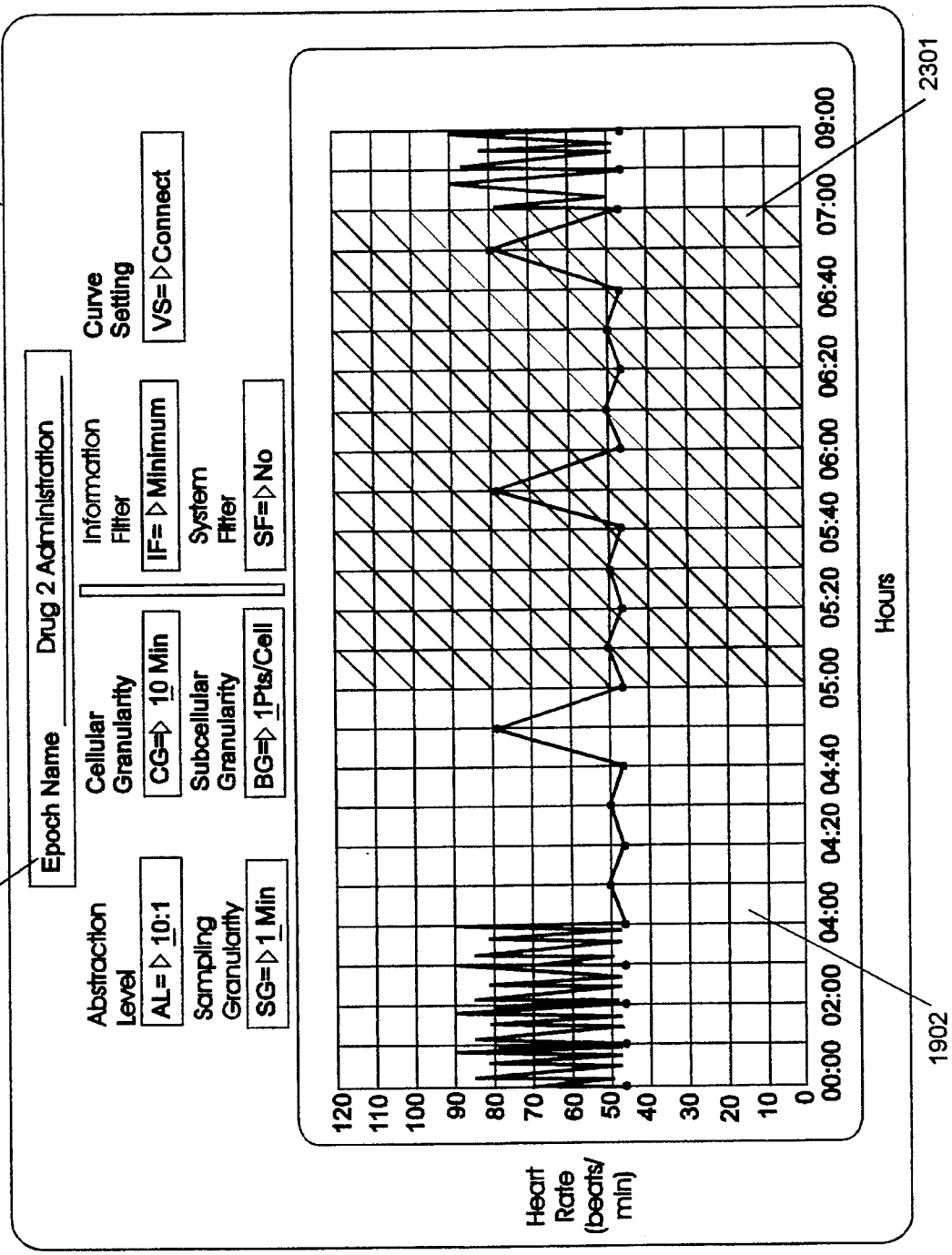
FIG. 23 illustrates the first nine hours of the data set shown in FIGS. 21 and 22, however, a second local epoch has been delineated along the x-axis.

FIG. 23 illustrates the first nine hours of the data set shown in FIGS. 21 and 22. In this illustration, Client 200 has delineated a second local epoch along the x-axis, Drug 2 Administration 2301, by interactively entering the epoch name 1901. Epoch Drug 2 Administration 2301 lies the x-axis, the boundary being between hours 5 and 7. Note that Drug 2 Administration 2301 epoch's left-hand boundary begins within the boundaries of Drug 1 Administration 1902 epoch, and that the right-hand boundary of Drug 2 Administration 2301 epoch extends beyond Drug 2 Administration 2301 epoch's right-hand boundary.

In order to avoid potentially confusing visualizations resulting from the existence of overlapping epochs, the illustrated embodiment automatically redefines the boundaries of existing epochs when a newer epoch is defined within the older epoch's boundaries. In this case, the boundaries of Drug 1 Administration 1902 are now 4 and 5 hours), while the boundaries of Drug 2 Administration 2301 are 5 and 7 hours. When the definition of a new epoch involves a portion of an existing epoch, the illustrated embodiment copies the specific abstraction metrics from the existing epoch, Drug 1 Administration 1902, into the new epoch, Drug 2 Administration 2301. Thus, the illustration shows that the set of abstraction metrics for the newer epoch, Drug 2 Administration 2301, are identical to those of older epoch. Once the newer epoch has been defined, its abstraction metrics are adjusted independent of those for the older epoch. Note, the only change to the older epoch's abstraction metrics is that its right-hand boundary has changed from 6 to 5 hours, reflecting Client 200's interest in including the time period from 5 to 6 hours in the new epoch, Drug 2 Administration 2301. In the event that Client 200 had defined Drug 2 Administration 2301 epoch entirely within the existing boundaries of Drug 1 Administration 1902 epoch (e.g., if the new epoch had been defined as the time period from 4:40 to 5:40 hours, the illustrated embodiment would have created a new third epoch whose boundaries would run from 5:40 to 6 hours, the older epoch's former right-hand boundary.

Figure 24:
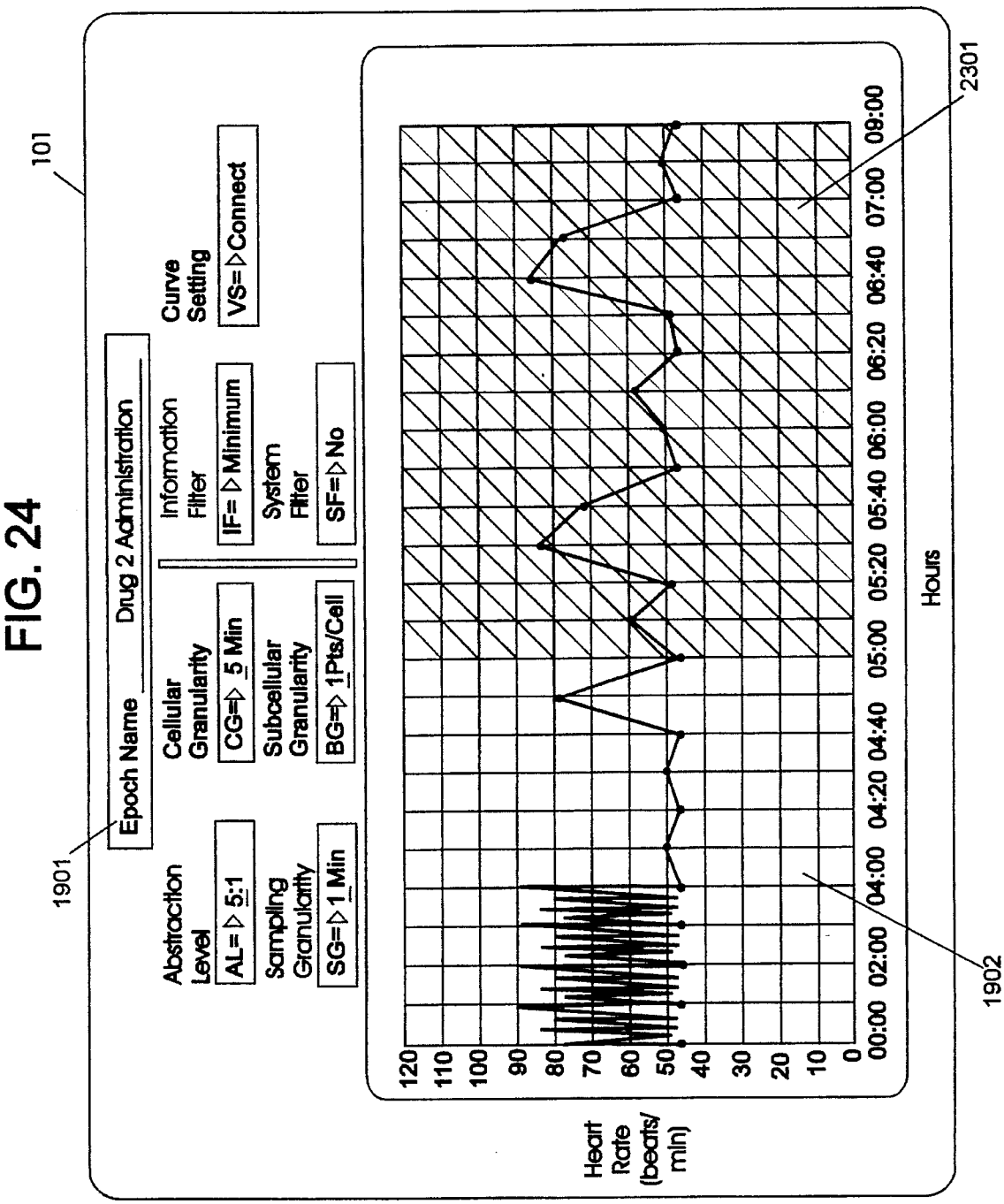
FIG. 24 illustrates the first six hours and ten minutes of the data set shown in FIGS. 21–23, however, cellular granularity has been decreased from to 5 minutes within the second local epoch.

FIG. 24 illustrates the first six hours and ten minutes of the data set shown in FIGS. 21–23. In this illustration, Client 200 has decreased Cellular Granularity from 10 to 5 minutes, note that this is the only abstraction metrics altered from the prior illustration, FIG. 23. This illustration demonstrates the degree that a given visualization may change simply by increasing the cellular information density (Cellular Granularity).

Figure 25:
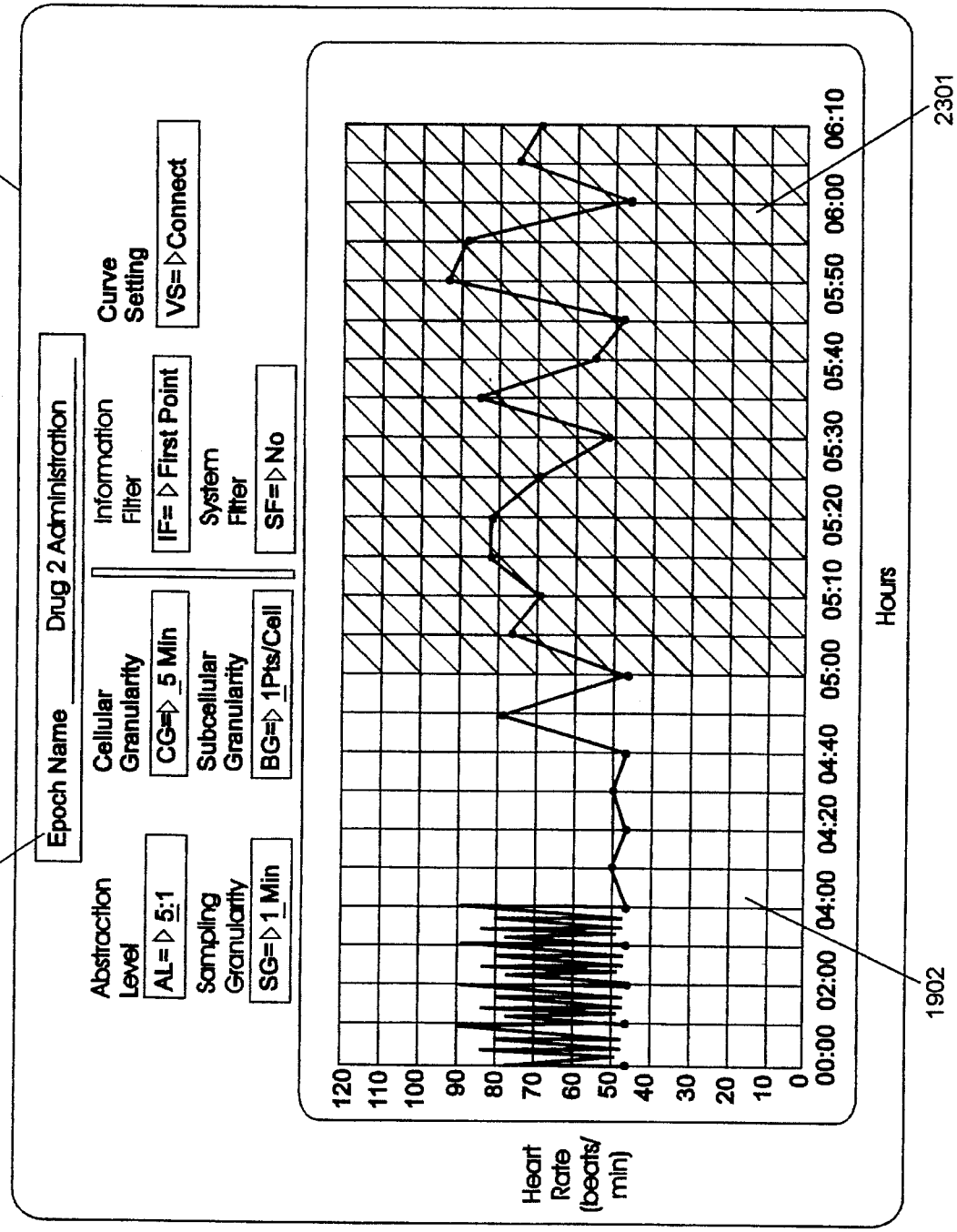
FIG. 25 illustrates the identical data set as that shown in FIG. 24, however, the information filter has been set to "First Point" within the second epoch demonstrating the variation a given visualization may experience simply by altering the information filter.

FIG. 25 illustrates the identical data set as that shown in FIG. 24. In this illustration, Client 200 has set Information Filters to "First Point" filter. This illustration demonstrates the degree that a given visualization may change simply by changing Information Filters. Again, note that this is the only abstraction metrics altered from the prior illustration, FIG. 23.

Figure 26:
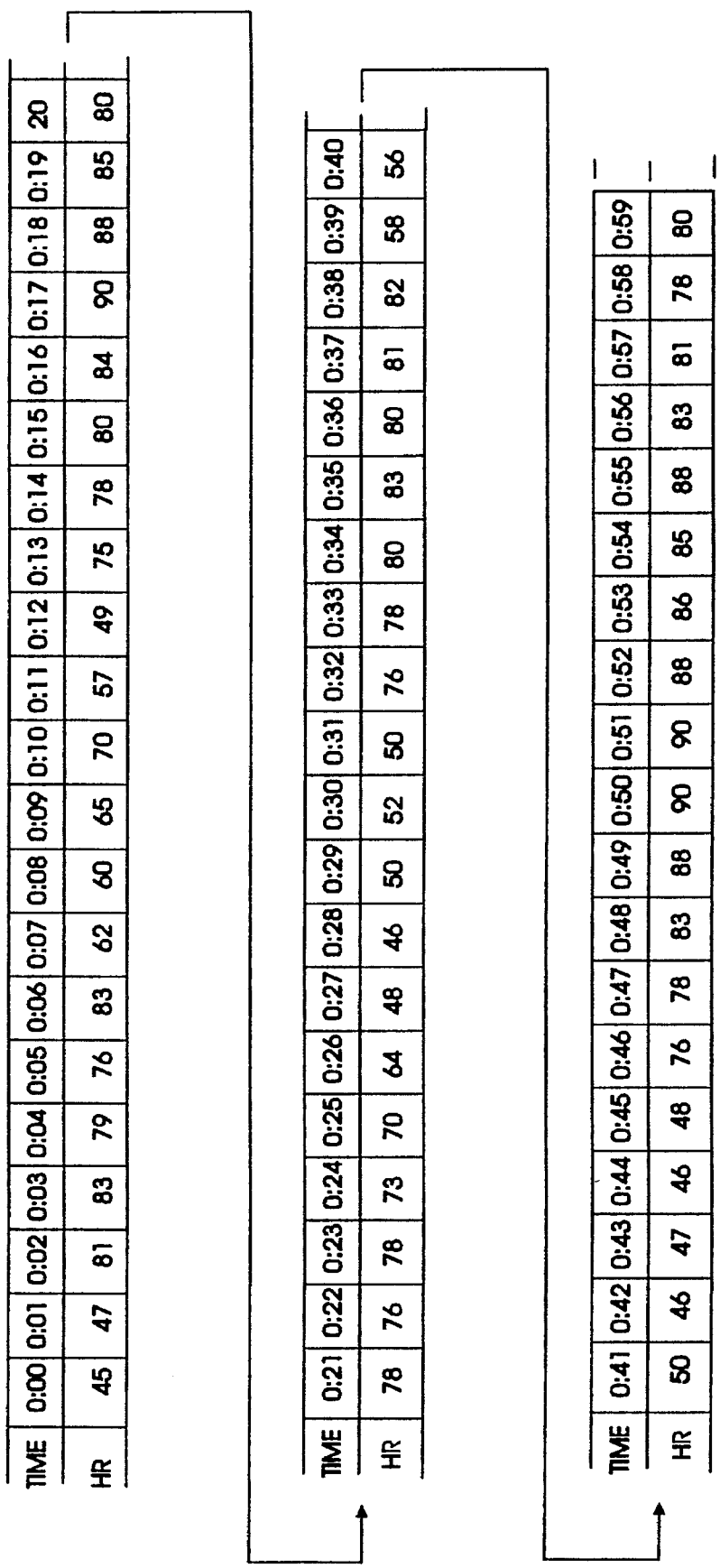
FIG. 26 illustrates 60 minutes of an input multivariate, time-ordered medical data set.
Figure 27:
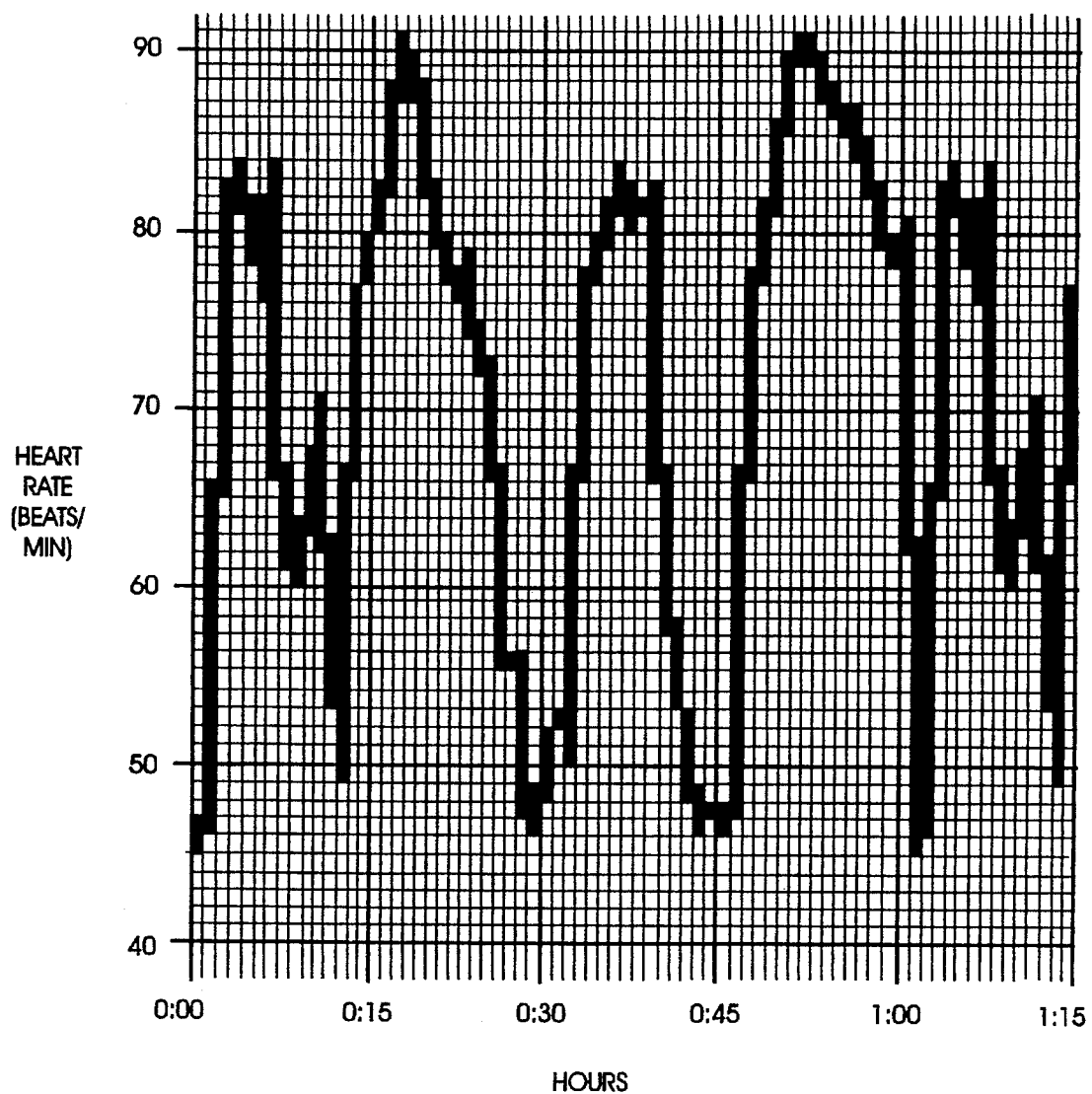
FIG. 27 illustrates 75 minutes of data taken from the data set shown in FIG. 26.

FIGS. 26–29 illustrate a simple contrast between the data magnification/demagnification of the prior art with inherent data distortion, and certain aspects of the methodology of the present invention. FIG. 26 illustrates 60 minutes of an input multivariate, time-ordered medical data set. FIG. 27 illustrates 75 minutes of data taken from the data set shown in FIG. 26 (note, the input data set represents heart rate data gathered at the rate of one value per minute, although one hour's worth of data has been gathered a virtual data set of 1.25 hours has been created by concatenating the input data set together, i.e., time period 0:00–015 is equal to time period 1:00–1:15). In this illustration, the input data set is visualized on a hypothetical grid of 15 data points per grid cell and 15 pixels per grid cell, which allows the data set to be visualized at one data point per pixel.

Figure 28:
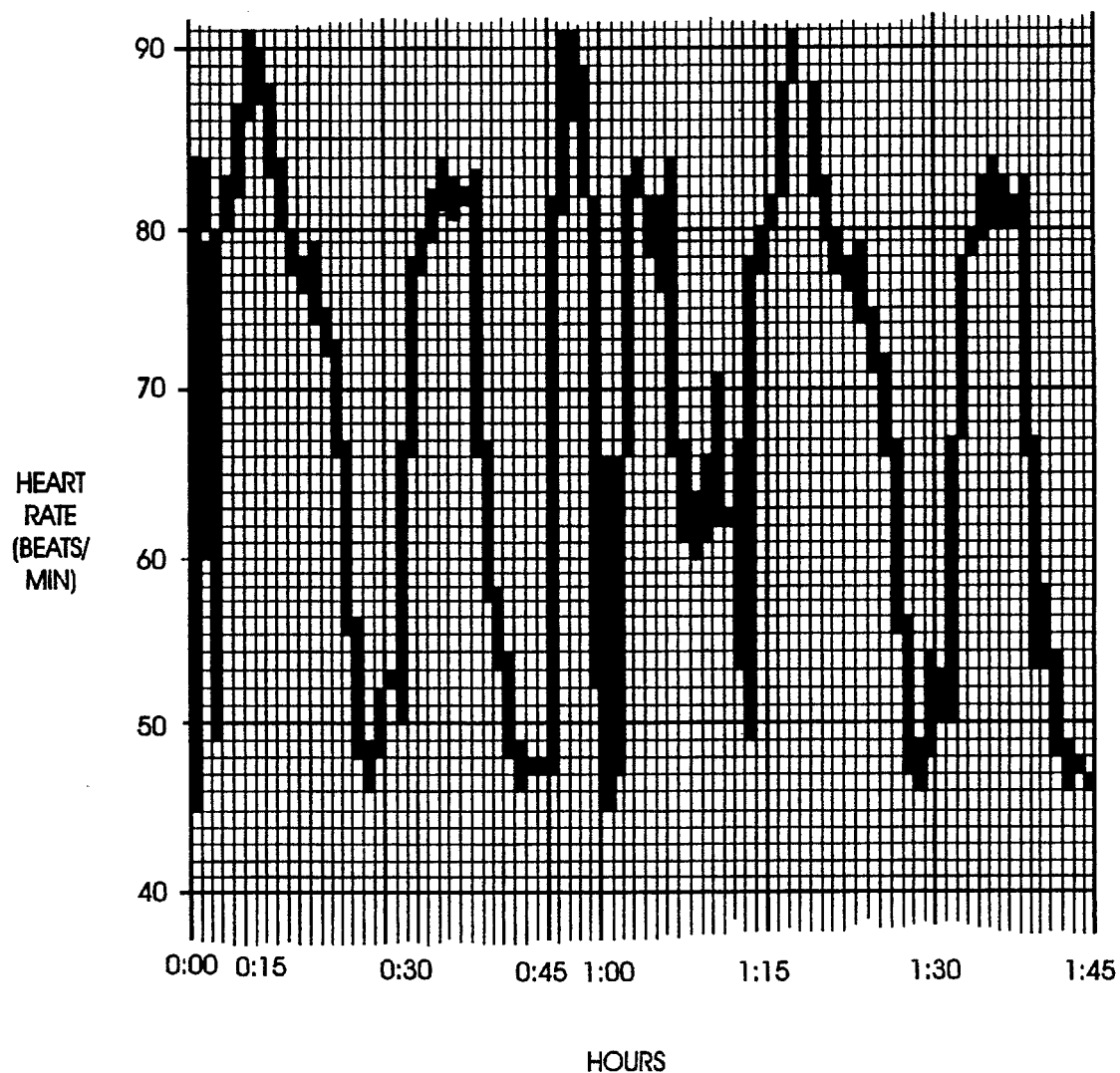
FIG. 28 illustrates the effect of "local zooming" upon the input data set of FIG. 27.

FIG. 28 illustrates the effect of "local zooming" upon the input data set, i.e. data demagnification by a factor of 5:1 during the first 15 minutes and data demagnification by a factor of 3:1 during the fourth 15 minutes. Note the visual disruption caused by the graph having grid cells of varying physical size but identical data magnitude, i.e., 15 minutes. This illustration also demonstrates the data distortion that occurs when a user zooms out on data to a degree that the underlying architecture plots more data points than there are physical pixels.

Figure 29:
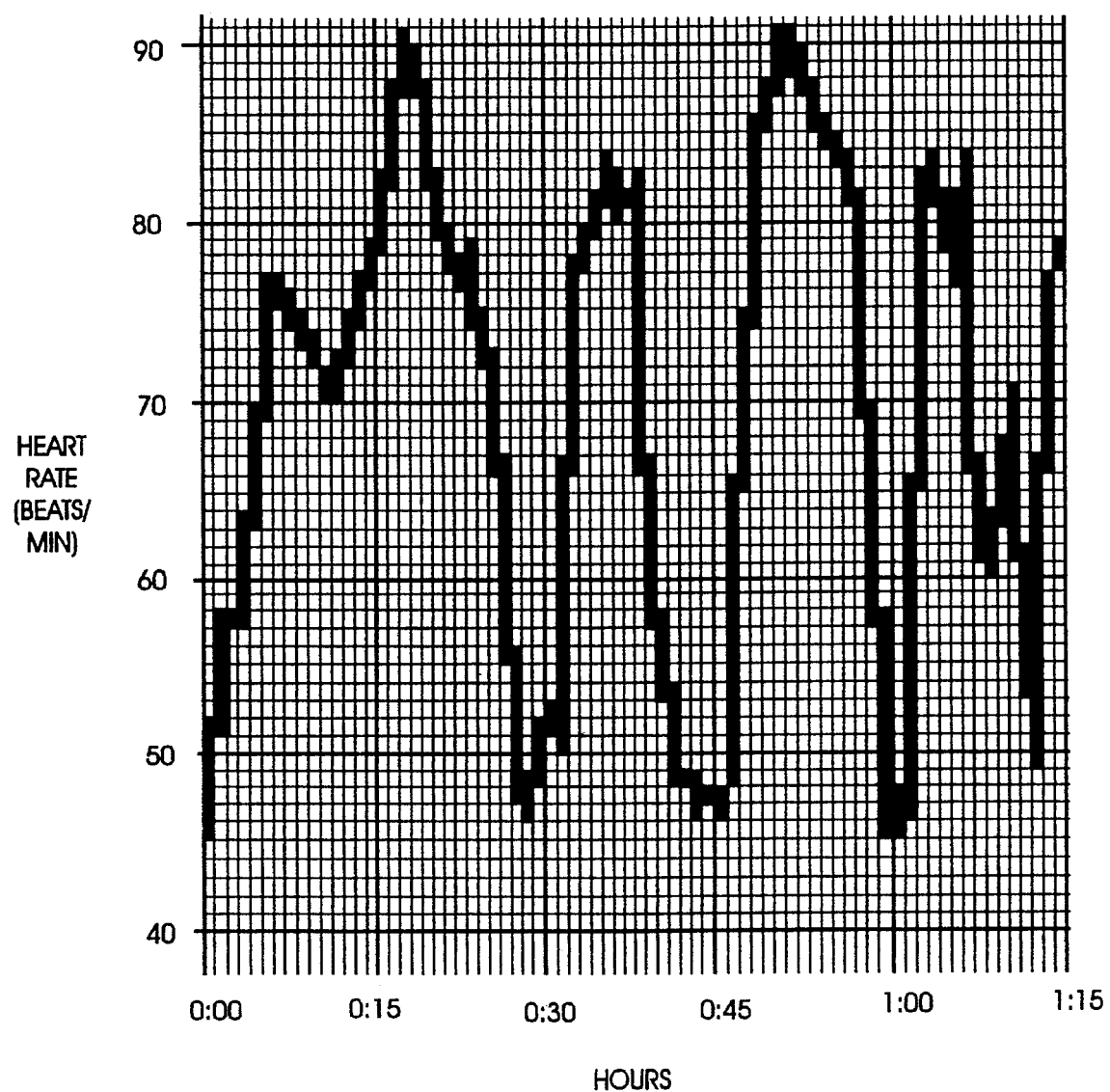
FIG. 29 illustrates one effect of data abstraction/information hiding of the present invention upon the input data set of FIG. 27.

FIG. 29 illustrates one effect of data abstraction/information hiding of the present invention upon the input data set under equivalent restrictions, namely, a 5:1 downward abstraction during the first 15 minutes and a 3:1 downward abstraction during the fourth 15 minutes. Note that both the data distortion of FIG. 28 and the visual disunity of varying-size grid cells are absent from this illustration. The data abstraction shown is accomplished via application of the First Point (Decimation) filter (previously introduced and discussed) which achieves an N:1 data abstraction by visualizing every Nth point. As has been discussed throughout this document, data abstraction within the context of the illustrated embodiment is under the control of Client 200. Accordingly, data abstraction may occur via an infinite variety of information processing filters and algorithms.

Although the illustrated embodiment has been customized for use in visualizing multivariate, time-ordered medical data in two dimensions, alternate embodiments utilizing the underlying methodology may produce n-dimensional, m-parameter visualized data space. Accordingly, the present discussion and demonstration figures contained in this document were included to present the underlying principles of the invention graphically and, as such, were constructed for clarity of concept. Implementation of the illustrated embodiment in two dimensions does not suggest that the invention is limited to data visualization in two dimensions utilizing a single parameter data stream. Therefore, although the illustrated embodiment utilizes only simple information-processing filters including First Point (Decimation), Last Point, MidPoint, Minimum, Maximum, Average and WeightedAverage, an alternate embodiment of the invention may enable Client 200 to utilize a tool kit for designing and implementing more complex custom information filters. Further, in the illustrated embodiment, although a single point is returned from the information filter for each set of RDS 203 points input to a particular filter, the methodology of the invention may utilize more complex filters whose output consists of either multiple points or more abstract information such as "presentation hints" which would be passed to the rendering routines.

Although the present invention and its advantages have been described in detail, it should be understood that various changes, substitutions and alterations can be made herein without departing from the spirit and scope of the invention as defined by the appended claims.

What is claimed is:

1. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein said input data set is multivariate, time-ordered medical data.

2. A computer for processing a received input data set comprised of one or more datum in response to a received input command and generating an output data set for display, on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, said processing module including means for storing enabled selected abstraction metrics algorithms and filters for both said input data set and said one or more circumscribed, context-sensitive data subsets.

3. The computer as set forth in claim 2 wherein said processing module further includes:

means for retrieving said enabled selected abstraction metrics algorithms and filters for both said input data set and said one or more circumscribed, context-sensitive data subsets from said storage means.

4. The computer as set forth in claim 3 wherein said processing module further includes:

means for controlling processing of each particular datum of said input data set utilizing retrieved enabled selected abstraction metrics algorithms and filters corresponding to a particular circumscribed, context-sensitive data subset within which each particular datum is a member.

5. A processing system for generating an output data set for display on a data visualization device, said processing system comprising:

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, said second processing module including means for storing enabled selected abstraction metrics algorithms and filters for both said input data set and said one or more circumscribed, context-sensitive data subsets.

6. The processing system as set forth in claim 5 wherein said second processing module further includes:

first means, enabled if a first datum is a member of a first circumscribed, context-sensitive data subset, for retrieving first stored enabled selected abstraction metrics algorithms and filters corresponding to said first circumscribed, context-sensitive data subset.

7. The processing system as set forth in claim 6 wherein said second processing module further includes:

second means, enabled if said first datum is not a member of any circumscribed, context-sensitive data subset, for retrieving stored enabled selected abstraction metrics algorithms and filters corresponding to said input data set.

8. A processing system for generating an output data set for display on a data visualization device, said processing system comprising:

a first input port for receiving an input data set in which said input data is multivariate, time-ordered medical data, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set: and a second processing module, responsive to said input command, operable to enable selected ones of a plurality abstraction metrics algorithms and filters, and to process each datum of said input data set utilizing said enabled abstraction metrics algorithms and filters to generate said output data set.

9. A processing system for generating an output data set for display on a data visualization device, said processing system comprising:

a first input port for receiving an input data set, said input data set comprised of one or more datum, wherein said input data set is received through said input port in real-time;

a second input port for receiving an input command from a client, said input command operable to control processing of said input data set;

a first processing module, selectably responsive to said input command, operable to delineate a circumscribed, context-sensitive data subset within said input data set: and a second processing module, responsive to said input command, operable to enable selected ones of a plurality abstraction metrics algorithms and filters, and to process each datum of said input data set utilizing said enabled abstraction metrics algorithms and filters to generate said output data set.

10. A data visualization system, implemented within a processing system, for processing a received input data set comprised of one or more datum and generating an output data set as a result thereof, said data visualization system comprising:

an input port for interactively receiving one or more input commands from a client, said input commands operable to dynamically control processing of said input data set on a per datum basis; and a data processor operable to generate said output data set, said data processor comprising:

means, selectively responsive to particular ones of said input commands, for delineating circumscribed, context-sensitive data subsets within said input data set; and means, responsive to particular ones of said input commands, for applying selected ones of a plurality of information processing filters and algorithms to each datum comprising each one of said delineated circumscribed, context-sensitive data subsets.

11. The data visualization system as set forth in claim 10 wherein said data processor further includes:

means for storing selected abstraction metrics algorithms and filters for each one of said circumscribed, context-sensitive data subsets.

12. The data visualization system as set forth in claim 10 wherein said data processor further includes:

means enabled if a first datum is a member of a first circumscribed, context-sensitive data subset for retrieving first stored selected abstraction metrics algorithms and filters corresponding to said first circumscribed, context-sensitive data subset.

13. The data visualization system as set forth in claim 10 wherein said input data set is multivariate, time-ordered medical data.

14. The data visualization system as set forth in claim 10 further comprising:

a data visualization device, said data visualization device operable to display said output data set.

15. The data visualization system as set forth in claim 14 further comprising:

a data visualization device, said data visualization device operable to display said output data set in multiple-dimensions.

16. The processing system as set forth in claim 10 wherein said input data set is received in real-time.

17. The system as set forth in claim 10, wherein one of said plurality of abstraction metrics algorithms and filters controls sampling granularity of said output data set to be displayed on said data visualization device.

18. The system as set forth in claim 10, wherein each of said one or more circumscribed, context-sensitive data subsets within said input data set is associated with a local epoch, and wherein each said local epoch is associated with its own set of abstraction metrics algorithms and filters for generating said output data set for each said local epoch, and wherein each of said local epoch's abstraction metrics algorithms and filters may be separately modified without affecting values of abstraction metrics algorithms and filters of other local epochs.

19. The system as set forth in claim 10, wherein said plurality of abstraction metrics algorithms and filters enabled for a data subset determine an abstraction level for visualizing said output data set on said data visualization device.

20. The system as set forth in claim 19, wherein said abstraction level =(cellular granularity)/(subcellular granularity*sampling granularity).

21. A method of generating an output data set for display on a data visualization device, said method comprising the steps of:

receiving an input data set, said input data set comprised of one or more datum;

interactively receiving at least one input data visualization command from a client, said input data visualization command operable to dynamically control processing of said input data set on a per datum basis;

selectively delineating a first data subset within said input data set in response to said interactively received visualization command;

selectively enabling at least one of a plurality of selectable information processing parameters for said delineated first data subset in response to said interactively received visualization command; and processing said input data set by applying said enabled selectable information processing parameters corresponding to each datum comprising said delineated first data subset thereby generating said output data set.

22. The method as set forth in claim 21 further including the step of:

displaying said output data set on said data visualization device.

23. The method as set forth in claim 22, wherein said data visualization device is operable to display said output data set in accordance with a predetermined abstraction level, and wherein said data visualization device also displays values for one or more of said abstraction level, cellular granularity, sampling granularity and subcellular granularity.

24. The method as set forth in claim 21 wherein said selectively enabling step further includes the step of:

storing said enabled selectable information processing parameters.

25. The method as set forth in claim 21 wherein said processing step further includes the step of:

retrieving said stored enabled selectable information processing parameters corresponding to a first datum of said delineated first data subset.

26. The method as set forth in claim 25 wherein said processing step further includes the step of:

retrieving a stored default set comprised of one or more information processing parameters if said first datum is not associated with said delineated first data subset.

27. The method as set forth in claim 26 further includes the step of:

updating said stored default set in response to said interactively received visualization command.

28. The method as set forth in claim 26 further includes the step of:

selectively delineating a second data subset within said first data subset in response to said interactively received visualization command.

29. The method as set forth in claim 28 further includes the step of:

updating said stored enabled selectable information processing parameters corresponding to a first datum of said delineated first data subset in response to said interactively received visualization command selectively delineating said second data subset.

30. The method as set forth in claim 21, wherein one of said plurality of abstraction metrics algorithms and filters controls cellular granularity of said output data set to be displayed on said data visualization device.

31. The method as set forth in claim 21, wherein one of said plurality of abstraction metrics algorithms and filters controls subcellular granularity of said output data set to be displayed on said data visualization device.

32. The method as set forth in claim 21, wherein one of said plurality of abstraction metrics algorithms and filters controls sampling granularity of said output data set to be displayed on said data visualization device.

33. The method as set forth in claim 21, wherein one of said plurality of abstraction metrics algorithms and filters further comprises an information filter operable to control an abstraction level of visualization of said output data set, wherein said information filter is selected from the group consisting of First Point, Minimum, Maximum, Midpoint, Average, and Weighted Average.

34. The method as set forth in claim 21, wherein one of said plurality of abstraction metrics algorithms and filters further comprises a curve setting for display of said output data set, wherein said curve setting is selected from the group consisting of Data Only, Connect, and Spline.

35. The method as set forth in claim 21, wherein each of said one or more circumscribed, context-sensitive data subsets within said input data set is associated with a local epoch, and wherein each said local epoch is associated with its own set of abstraction metrics algorithms and filters for generating said output data set for each said local epoch, and wherein each of said local epoch's abstraction metrics algorithms and filters may be separately modified without affecting values of abstraction metrics algorithms and filters of other local epochs.

36. The method as set forth in claim 35, wherein if no said local epoch's are defined then said each datum of said input data set is processed with abstraction metrics algorithms and filters associated with a defined default epoch.

37. The method as set forth in claim 21, wherein said plurality of abstraction metrics algorithms and filters enabled for a data subset determine an abstraction level for visualizing said output data set on said data visualization device.

38. The method as set forth in claim 37, wherein said abstraction level reflects a degree to which said each datum of said input data set are hidden from view during display of said output data set on said data visualization device.

39. The method as set forth in claim 37, wherein said abstraction level varies from epoch to epoch and is a function of both cellular granularity and subcellular granularity.

40. The method as set forth in claim 37, wherein said abstraction level =(cellular granularity)/(subcellular granularity*sampling granularity).

41. The method as set forth in claim 37, wherein abstraction level is directly proportional to cellular granularity.

42. The method as set forth in claim 37, wherein abstraction level is inversely proportional to subcellular granularity.

43. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein one of said plurality of abstraction metrics algorithms and filters controls cellular granularity of said output data set to be displayed on said data visualization device.

44. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein one of said plurality of abstraction metrics algorithms and filters controls subcellular granularity of said output data set to be displayed on said data visualization device.

45. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein one of said plurality of abstraction metrics algorithms and filters controls sampling granularity of said output data set to be displayed on said data visualization device.

46. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein one of said plurality of abstraction metrics algorithms and filters further comprises an information filter operable to control an abstraction level of visualization of said output data set, wherein said information filter is selected from the group consisting of First Point, Minimum, Maximum, Midpoint, Average, and Weighted Average.

47. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein one of said plurality of abstraction metrics algorithms and filters further comprises a curve setting for display of said output data set, wherein said curve setting is selected from the group consisting of Data Only, Connect, and Spline.

48. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein each of said one or more circumscribed, context-sensitive data subsets within said input data set is associated with a local epoch, and wherein each said local epoch is associated with its own set of abstraction metrics algorithms and filters for generating said output data set for each said local epoch, and wherein each of said local epoch's abstraction metrics algorithms and filters may be separately modified without affecting values of abstraction metrics algorithms and filters of other local epochs.

49. The computer as set forth in claim 48, wherein if no said local epoch's are defined then said each datum of said input data set is processed with abstraction metrics algorithms and filters associated with a defined default epoch.

50. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions; and a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set, wherein said plurality of abstraction metrics algorithms and filters enabled for a data subset determine an abstraction level for visualizing said output data set on said data visualization device.

51. The computer as set forth in claim 50, wherein said abstraction level reflects a degree to which said each datum of said input data set are hidden from view during display of said output data set on said data visualization device.

52. The computer as set forth in claim 50, wherein said abstraction level varies from epoch to epoch and is a function of both cellular granularity and subcellular granularity.

53. The computer as set forth in claim 50, wherein said abstraction level =(cellular granularity)/(subcellular granularity*sampling granularity).

54. The computer as set forth in claim 50, wherein abstraction level is directly proportional to cellular granularity.

55. The computer as set forth in claim 50, wherein abstraction level is inversely proportional to subcellular granularity.

56. A computer for processing a received input data set comprised of one or more datum in response to a received input command and generating an output data set for display on a data visualization device, said computer comprising:

at least one processing unit for interpreting and executing one or more instructions;

at least one memory storage device for storing data and one or more instructions;

a processing module, responsive to said input command, selectably operable to delineate one or more circumscribed, context-sensitive data subsets within said input data set, and operable to enable selected ones of a plurality of abstraction metrics algorithms and filters and to process each datum of said input data set utilizing said enabled selected abstraction metrics algorithms and filters to generate said output data set; and a data visualization device, said data visualization device operable to display said output data set, wherein said data visualization device is operable to display said output data set in accordance with a predetermined abstraction level, and wherein said data visualization device also displays values for one or more of said abstraction level, cellular granularity, sampling granularity and subcellular granularity.

57. A processing system for generating an output data set for display on a data visualization device, said processing system comprising:

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, wherein one of said plurality of abstraction metrics algorithms and filters controls cellular granularity of said output data set to be displayed on said data visualization device.

58. A processing system for generating an output data set for display on a data visualization device, said processing system comprising:

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, wherein one of said plurality of abstraction metrics algorithms and filters controls subcellular granularity of said output data set to be displayed on said data visualization device.

59. A processing system for generating an output data set for display on a data visualization device, said processing system comprising;

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, wherein each of said one or more circumscribed, context-sensitive data subsets within said input data set is associated with a local epoch, and wherein each said local epoch is associated with its own set of abstraction metrics algorithms and filters for generating said output data set for each said local epoch, and wherein each of said local epoch's abstraction metrics algorithms and filters may be separately modified without affecting values of abstraction metrics algorithms and filters of other local epochs.

60. A processing system for generating an output data set for display on a data visualization device, said processing system comprising:

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, wherein said plurality of abstraction metrics algorithms and filters enabled for a data subset determine an abstraction level for visualizing said output data set on said data visualization device.

61. The computer as set forth in claim 60, wherein said abstraction level varies from epoch to epoch and is a function of both cellular granularity and subcellular granularity.

62. The processing system as set forth in claim 60, wherein said abstraction level=(cellular granularity)/(subcellular granularity*sampling granularity).

63. A processing system for generating an output data set for display on a data visualization devices said processing system comprising:

a first input port for receiving an input data set, said input data set comprised of one or more datum;

a second input port for receiving an input command from a client, said input command operable to control processing of said input data set;

a first processing module, selectably responsive to said input command, operable to delineate a circumscribed, context-sensitive data subset within said input data set; and a second processing module, responsive to said input command, operable to enable selected ones of a plurality of abstraction metrics algorithms and filters, and to process each datum of said input data set utilizing said enabled abstraction metrics algorithms and filters to generate said output data set, wherein said data visualization device is further operable to display said output data set in multiple dimensions, wherein said data visualization device is operable to display said output data set in accordance with a predetermined abstraction level, and wherein said data visualization device also displays values for one or more of said abstraction level, cellular granularity, sampling granularity and subcellular granularity.

\* \* \* \* \*